(12) United States Patent
Wheeler et al.

(10) Patent No.: US 9,151,441 B2
(45) Date of Patent: Oct. 6, 2015

(54) ADJUSTABLE SUSPENSION APPARATUS AND METHOD OF USE

(71) Applicant: NTI Products, LLC, Reno, NV (US)

(72) Inventors: Robert A. Wheeler, Reno, NV (US); Brian D. Wheeler, Reno, NV (US)

(73) Assignee: NTI Products, LLC, Reno, NV (US)

( * ) Notice: Subject to any disclaimer, the term of this patent is extended or adjusted under 35 U.S.C. 154(b) by 0 days.

(21) Appl. No.: 13/840,448

(22) Filed: Mar. 15, 2013

(65) Prior Publication Data

US 2013/0240702 A1  Sep. 19, 2013

Related U.S. Application Data

(60) Provisional application No. 61/612,729, filed on Mar. 19, 2012, provisional application No. 61/751,519, filed on Jan. 11, 2013.

(51) Int. Cl.
*A47G 1/16* (2006.01)
*F16M 13/02* (2006.01)

(52) U.S. Cl.
CPC ............. *F16M 13/022* (2013.01); *A47G 1/164* (2013.01); *A47G 1/1613* (2013.01)

(58) Field of Classification Search
CPC ................... A47G 1/16–1/164; A47G 1/1686; A47G 1/202; A47G 1/24; F16M 13/022
USPC ........... 248/447.1, 466, 475.1, 476, 477, 480, 248/489, 495, 496, 298.1; 40/713, 759, 40/761, 762, 757, 745
See application file for complete search history.

(56) References Cited

U.S. PATENT DOCUMENTS

| | | | | |
|---|---|---|---|---|
| 1,107,686 | A | | 8/1914 | Mehrmann |
| 3,169,738 | A | * | 2/1965 | Johnson ......................... 248/496 |
| 3,529,799 | A | * | 9/1970 | Schaefer ....................... 248/496 |
| 4,069,998 | A | * | 1/1978 | Rytting .......................... 248/476 |
| 4,171,117 | A | | 10/1979 | Prochaska |
| 4,315,615 | A | | 2/1982 | Scocozza |
| 4,549,713 | A | * | 10/1985 | Magadini ..................... 248/495 |
| 4,611,780 | A | | 9/1986 | Robertson |

(Continued)

OTHER PUBLICATIONS

International Search Report and Written Opinion of the International Searching Authority for International Application PCT/US2013/032522, mailed Jun. 13, 2013.

*Primary Examiner* — Jonathan Liu
*Assistant Examiner* — Guang H Guan
(74) *Attorney, Agent, or Firm* — Holland & Hart LLP

(57) ABSTRACT

An adjustable suspension apparatus and method. One embodiment provides a substrate mounting apparatus that provides the ability to mount the apparatus on a substrate and move the location of a suspended object in at least a substantial two-dimensional planar area. One embodiment allows the suspended object to be moved vertically, laterally, and tilted or leveled with respect to the substrate by merely sliding one or more components of the apparatus from one place to another on the apparatus, without moving the components of the apparatus mounted on the substrate. One embodiment includes a laterally extending element, a peaked or inverted-peaked structure, and interconnecting supports providing for mounting of the laterally extending element to the substrate and sliding support for laterally slidable members. The laterally extending element provides lateral adjustability, with these three features combined cooperatively providing lateral, vertical, and tilting or leveling adjustability of an object mounted on a substrate.

7 Claims, 24 Drawing Sheets

(56) References Cited

U.S. PATENT DOCUMENTS

| | | | |
|---|---|---|---|
| 4,771,897 A * | 9/1988 | Ho | 211/85.9 |
| 4,883,247 A * | 11/1989 | Crandall | 248/542 |
| 4,934,077 A * | 6/1990 | Gerlach | 40/730 |
| 4,973,021 A | 11/1990 | Schuite | |
| 5,069,411 A | 12/1991 | Murphy | |
| 5,303,895 A * | 4/1994 | Hart | 248/475.1 |
| 5,342,014 A * | 8/1994 | Wilson | 248/476 |
| 5,437,429 A * | 8/1995 | Atlas | 248/493 |
| 5,816,557 A | 10/1998 | Tepper | |
| 6,003,825 A * | 12/1999 | Abernathy, Jr. | 248/478 |
| 6,053,468 A | 4/2000 | Francis | |
| 6,719,260 B1 * | 4/2004 | Hart | 248/479 |
| 6,820,853 B1 * | 11/2004 | DuBarry | 248/489 |
| 7,198,244 B2 * | 4/2007 | Deline | 248/495 |
| 7,891,124 B1 | 2/2011 | Willis | |
| 8,205,844 B1 * | 6/2012 | Erickson et al. | 248/222.11 |
| 8,336,843 B2 * | 12/2012 | Gulbrandsen et al. | 248/317 |
| 8,757,568 B2 * | 6/2014 | Ko | 248/231.91 |
| 9,038,982 B1 * | 5/2015 | Marks | 248/495 |
| 2005/0072894 A1 * | 4/2005 | Grant | 248/475.1 |
| 2013/0240702 A1 * | 9/2013 | Wheeler et al. | 248/297.31 |

\* cited by examiner

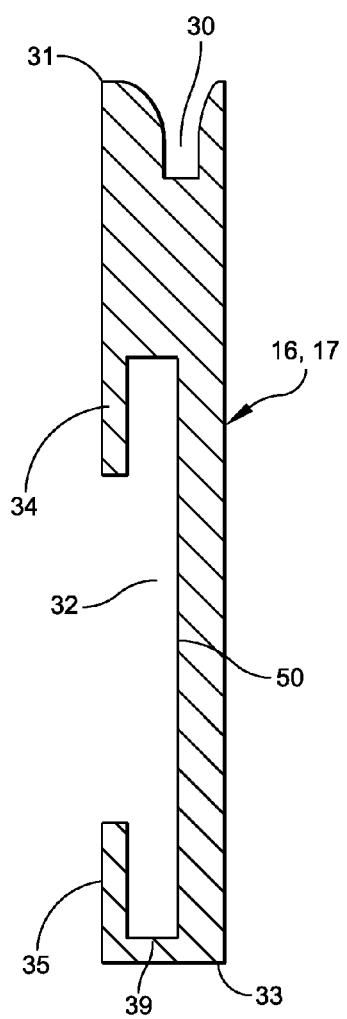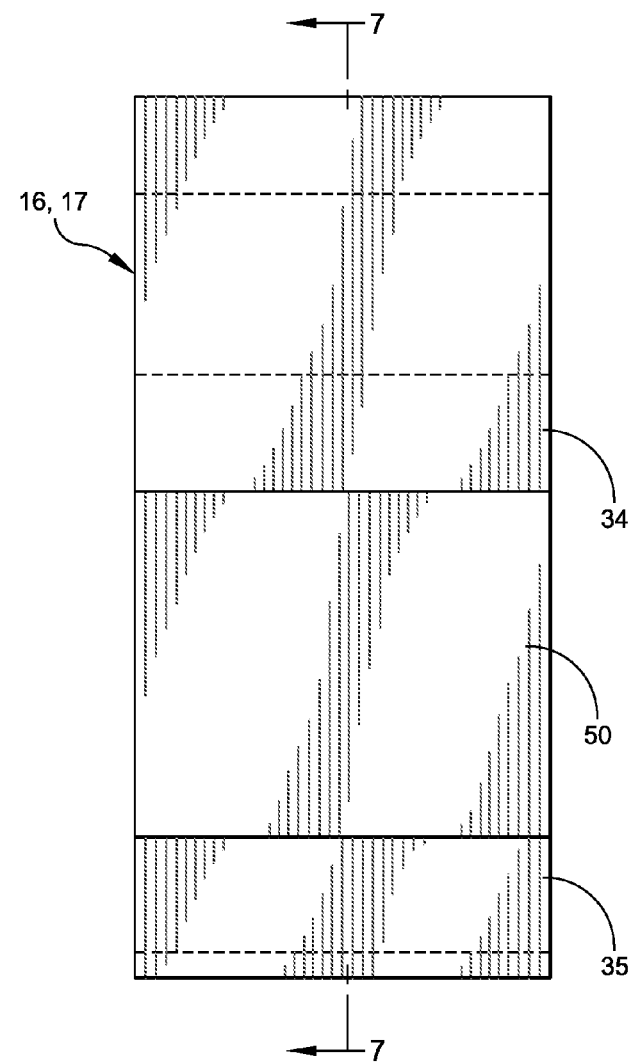
Figure 7A
Figure 7B

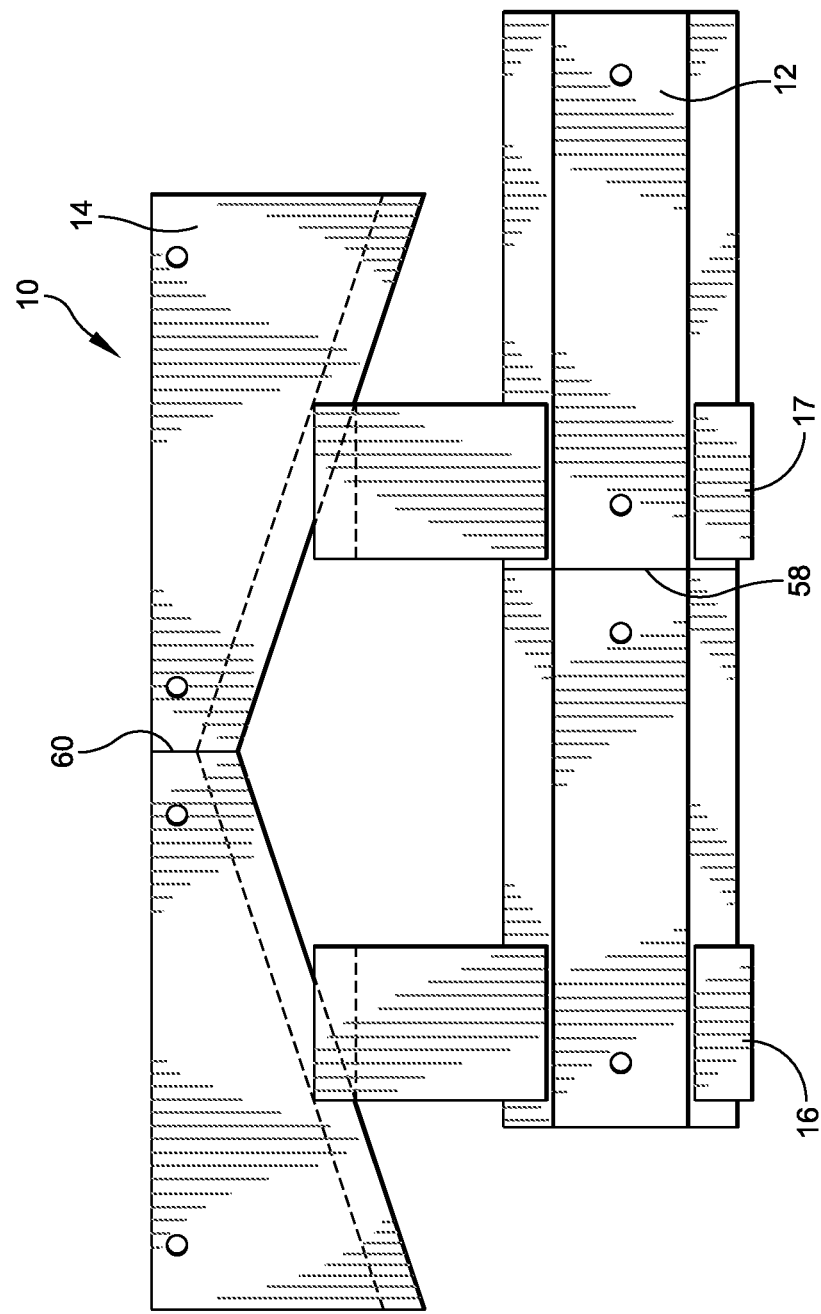

ically vertical substrate, such as wall for example.
ADJUSTABLE SUSPENSION APPARATUS AND METHOD OF USE

CROSS-REFERENCE TO RELATED APPLICATION

The present nonprovisional application claims priority through Applicants' prior provisional patent applications titled "Adjustable Suspension Apparatus and Method of Use," Ser. No. 61/612,729, filed Mar. 19, 2012, and "Adjustable Suspension Apparatus and Method of Use," Ser. No. 61/751,519, filed Jan. 11, 2013, which prior provisional patent applications are both hereby incorporated by reference in their entirety. In the event of any inconsistency between such prior provisional patent applications and the present nonprovisional application, the present nonprovisional application shall prevail.

FIELD OF INVENTION

The present application relates to an object suspension apparatus and more particularly to a multi-directional adjustable suspension apparatus for the suspending of an object.

BACKGROUND

Hanging objects on or from a vertical substrate, such as a wall for example, has been an every-day human activity for a very long time. Still today, however, this activity commonly requires careful measurement prior to the mounting of the suspension apparatus to the vertical substrate.

For example, when hanging a picture, the person hanging the object commonly seeks to have it located at a relatively precise location on the wall, often with respect to other structures in the room, other wall hangings, etc. Adjusting the position of the object after first suspending on a substrate has long presented substantial and well known problems.

One method of suspending objects from a vertical substrate involves mounting one or more hook-shaped structures to a vertical substrate and then attaching the object directly to the hooks. Often, the operator desires to move the object upwardly, downwardly, to the side, or both. Doing so often requires either or both of removing and re-mounting the hook structure or adjusting the mating suspension structure on the object if possible. Multiple iterations of this procedure are often required to "get it right."

Even if the object can be moved to the side with a given hook mounting technique, the object will often tilt around the hook unacceptably. Further, the movement of the suspended object along the substrate often further damages the substrate.

Other methods allow for adjustment of an object's position based upon a stepped form of leveling. These methods may include a bracket fixed to the object that can be positioned on another bracket attached to a wall having two stepped channels, with the object bracket having 2 peaked portions that engage the stepped channels of the wall bracket. These methods provide for only one object position that is level by the nature of the stepped channels, thus allowing for only a leveling adjustment. Another disadvantage to this method is that each step is a specific adjustment that may not result in a level condition, for example if the steps are larger than a desired leveling adjustment. As a result, the object may not be able to reach an optimal leveled position without remounting the apparatus to the vertical substrate.

Other methods allow for only a lateral adjustment, such as attaching or hanging an object to a laterally sliding rail or other laterally slidable bracket system. One disadvantage of this method is that neither vertical adjustment nor leveling adjustment is supported, as the rail or bracket system allows for only movement in the lateral direction. As a result, it becomes particularly difficult to hang multiple objects in an aligned and evenly spaced manner without removing either the wall-mounted component or the object-mounted component of one or more objects, and subsequently reinstalling the removed components in order to achieve these adjustments. In many cases, this will result in damage to the vertical substrate or objects.

Still other methods allow for only vertical adjustment, such as hooks adjustably threaded to suspending structure secured to the substrate. These structures provide only vertical adjustment, and moving these structures laterally often results in substantial damage to the substrate.

BRIEF SUMMARY OF SOME ASPECTS OF THE DISCLOSURE

The present substrate mounting apparatus and method provide the ability to mount the apparatus on a substrate and move the location of a suspended object in at least a substantial two dimensional planar area. The size of the area can be readily altered by altering the spacing and/or size of components of the apparatus.

Some embodiments allow the suspended object to be moved, for example, up and down with respect to the substrate by merely sliding one or more components of the apparatus from one place to another on the apparatus.

Some embodiments allow the suspended object to be moved, for example, side to side with respect to the substrate also by merely sliding other components of the apparatus.

Certain instances support substantial leveling or tilting of the suspended object without moving the components of the apparatus mounted on the substrate.

Still other embodiments provide all of the above types of movements—up and down, side to side, leveling and tiling—in one mounting apparatus and without moving the components mounted to a substrate.

Some instances are mountable to a vertical or predominantly vertical substrate, such as wall for example.

One set of embodiments include opposed first and second somewhat wing-shaped elements providing opposite first and second lower surfaces forming a balanced or unbalanced inverted arcuate shape, C-, U-, or V-shape, or other peaked shape, respectively, mountable to a mounting side of an object. One or more support components can be mounted to the substrate. The one or more support components provide a first upper support section in mating support contact with the first lower surface laterally spaced from a second upper support section in mating support contact with the second lower surface. The opposed wings can be mounted on the respective support sections and tilted or leveled as desired about the laterally spaced first and second upper support sections.

Another set of embodiments can invert the opposed somewhat wing-shaped elements, with the opposed wing structure(s) being mountable to the substrate and one or more supported components mounted to the mounting side of an object. The opposed supported components, in supported contact with the opposed peak forming supporting surfaces, can be tilted or leveled as desired about the supporting surfaces.

Another type of inversion inverts the peaked structure. In some of these embodiments, the inverted peaked structure supports, or is supported by, opposed contact elements. The supported structure can be leveled or tilted about opposed contact elements, with the inverted peak intermediate the opposed contact elements.

Some embodiments provide a laterally extending element that can be mounted to the substrate and provide sliding support for laterally slidable members. Certain instances include a laterally extending element, a peaked structure or inverted peaked structure, and interconnecting supports. The laterally extending element can provide laterally adjustability; and these three features combined can cooperatively provide substantial lateral, transverse (in relation to lateral), and tilt or leveling adjustability of an object mounted on a substrate or other structure.

In some instances, the apparatus includes a first bracket with an elongated body and two adjustable support arms extending outwardly from one edge of the body providing a channel to receive a second bracket or wire. In some embodiments, the first bracket is mountable to the substrate, and the second bracket is mountable to an object to be suspended. In some instances, the substrate bracket has an inverted peaked cross-section (i.e, an inverted arcuate shape, which can include a C-, U-, V-, or J-shape). In some embodiments, the two adjustable support arms are adjustable in a longitudinal direction along the first elongated bracket. The two adjustable support arms may feature a "z-shaped" cross-section configured to receive both the first bracket and the second bracket. In some instances, the second bracket can have a notched or stepped cross-section at one end configured to engage one end of the "z-shaped" cross-section of the adjustable support arms. In certain embodiments, the second bracket has an arcuate or v-shape cross-section that can engage one end of the "z-shaped" cross-section of the adjustable support arms. In some embodiments, the two brackets together or the first elongated bracket and a wire attached to an object, provide for object hanging or mounting which allows independent adjustment in three ways, such as, vertically, horizontally, and leveling of the object.

In some instances, moving the mounted object laterally automatically adjusts the level of the object by, for example, changing the contact points of the adjustable support arms along the "z shaped" cross-section with the object bracket or wire, causing one side to rise while the other side drops, thus leveling the object.

In some embodiments and orientations, sliding the adjustable support arms along the substrate bracket in the same direction equally adjusts the lateral position of the object without affecting the level or vertical position of the object.

In some embodiments and orientations, sliding the adjustable support arms along the substrate bracket in opposite directions equally adjusts vertical position of the object without affecting the level or lateral position of the object. The contact points of the adjustable support arms with the object bracket or a wire attached to an object move equally and laterally on the edge of the "z-shaped" cross-section of the adjustable support arms, which causes the contact points to raise or lower while maintaining the object's lateral location and level condition.

In some embodiments, the object bracket may have an end portion with a constantly sloped cross-section to accommodate engagement with the "z-shaped" cross-section of the adjustable support arms.

In some configurations, the object bracket may have an end portion with a graduated varying sloped cross-section to accommodate engagement with the "z-shaped" cross-section of the adjustable support arms.

In yet other embodiments, the object bracket may have an end portion with a stepped or notched cross-section to accommodate engagement with the "z-shaped" cross-section of the adjustable support arms.

In some instances, the object bracket has an end portion with a combination of a stepped, notched, and/or curved cross-section to accommodate engagement with the "z-shaped" cross-section of the adjustable support arms.

In some embodiments, the size of the apparatus can be varied and the apparatus can be mounted in many ways, such as horizontally on a horizontal support structure, to provide for adjustability of the location of an object mounted to the apparatus with regard to the support structure.

In other configurations, the above adjustability can be realized with a single adjustable support arm, slidable in a sloped channel of the substrate bracket. In some embodiments, the adjustable support arm is notched at one end, to receive either a wire connected to the object or a second object bracket similarly connected to the object. This configuration may allow for independent adjustment in position of the object in three ways, including horizontal or lateral position, vertical position, and leveling as detailed above.

In yet other embodiments, the position of each bracket may be reversed with slight modification. In these embodiments, an elongated bracket may be mountable to the object. The bracket mountable to the substrate may have one or more sloped channels receiving one or more adjustable support arms. As described above, by moving the adjustable support arms laterally with respect to the substrate bracket in various ways, various positions adjustments to the object may be independently made. In some embodiments, a wire connected to the object may be substituted for the elongated object bracket, while maintain similar adjustability.

There are other aspects and advantages of the present apparatus and methods disclosed by the present specification. They will become apparent as the specification proceeds. In this regard, it is to be understood that the Background and this Brief Summary are not intended to be limiting, and thus the scope of an issued claim is to be determined by the claim as issued and not whether the claim addresses an issue noted in the Background or includes subject matter recited in this Brief Summary.

BRIEF DESCRIPTION OF THE DRAWINGS

The preferred and other embodiments are further disclosed in association with the accompanying drawings, in which:

FIG. 7A is a cross-sectional view of an adjustable support arm shown in FIGS. 1-4;

FIG. 7B is a front elevation view of the adjustable support arm of FIG. 7A taken along section line 7-7 of FIG. 7A;

FIG. 8B is a front elevation view of the substrate mounting apparatus shown in FIGS. 1-4;

Figure 1:
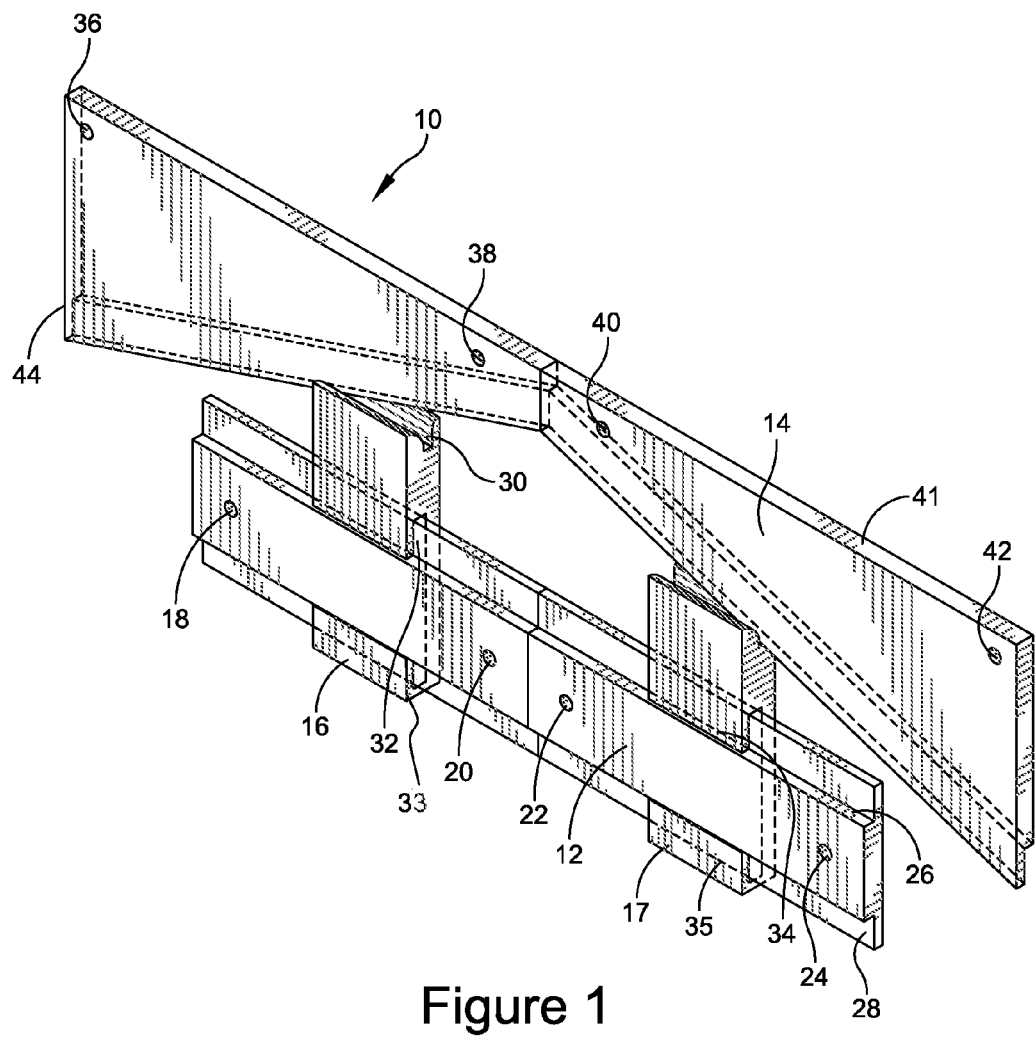
FIG. 1 is a perspective view of a substrate mounting apparatus.

It is to be understood that spatially-orienting terms, such as top, bottom, front, back, vertical, and horizontal, are used to explain relative orientation of structures as shown in the Figures and as the structures might be used. They are not to be construed, however, to require such an orientation in space.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, one of ordinary skill in the art will understand that the embodiments described herein are not intended to be limited to the particular forms disclosed. Rather, the instant disclosure covers all modifications, equivalents, and alternatives falling within the scope of the appended claims.

DETAILED DESCRIPTION

FIGS. 1-22 depict a substrate mounting apparatus that can be utilized to suspend and adjust the position of an object, particularly in three independent and different ways in a plane: horizontally or laterally, vertically, and by tilting and leveling. Components of the apparatus can be used differently, however, such as explained herein and in the Summary.

This specification describes a substrate mounting apparatus as mountable on a vertical or predominantly vertical substrate. The present disclosure is not so limited. Thus, throughout this disclosure, the term wall mounting apparatus 10 refers to a more particular embodiment of the substrate mountain apparatus 10, but such usage does not indicate that the components or functionality disclosed are limited to a mounting apparatus only suitable for vertical substrates or walls.

With reference now to FIG. 1, the wall mounting apparatus 10 includes a substrate bracket 12 (which may also be referred to through this disclosure as a base mounting bracket or a wall bracket), an object bracket 14, and two adjustable support arms 16, 17 slidably mounted to both the substrate bracket 12 and the object bracket 14.

The substrate bracket 12 has an elongated rectangular shape with a top substrate bracket edge 26 parallel and opposite to a bottom substrate bracket edge 28, with mounting holes 18, 20, 22, 24 spaced proximal to and along the top substrate bracket edge 26. The substrate bracket top and bottom edges 26, 28 define a notched cross-section.

The substrate bracket 12 is mountable to a substrate, such as a wall, using screws inserted through one or more mounting holes 18, 20, 22, 24. Other methods for mounting the substrate bracket 12 to a wall can be used, including such mounting methods as involve glue, adhesive tapes, nails, screws, mechanical devices or other types of fasteners. In other embodiments, the mounting holes 18, 20, 22, 24 can vary in number, size, and position on the substrate bracket 12 for attaching the substrate bracket 12 to a wall, to for example, accommodate different sizes and weights of objects to be suspended.

The adjustable support arms 16, 17 consist of two rectangular identical portions each with a top channel 30 having a rounded concave portion defining a top edge 31 of the adjustable support arms 16, 17. The top channel 30 is parallel and opposite to a bottom channel 32 having a front lip defined by an upper lip portion 34 and a lower lip portion 35 that slide over the top and bottom substrate bracket edges 26, 28 of the substrate bracket 12 and allow for the adjustable support arms 16, 17 to slide along the substrate bracket 12 in either lateral direction. The lower lip portion 35 forms part of a lower edge 33 of the adjustable support arm 16, 17, being opposite and parallel to the adjustable support arm top edge 31. In other embodiments, the adjustable support arms 16, 17 can vary in shape, size and relative similarity to one another.

The object bracket 14 has a flat reverse v-shape with mounting holes 36, 38, 40, 42 spaced proximal to and along an upper object bracket edge 41 opposite an object bracket bottom edge 44 defining a reverse or concave v-shape. The object bracket bottom edge 44 forms a guide, having a notched cross-section, insertable into the top channel 30 of the adjustable support arms 16, 17. The channel 30 forms the upper edge 31 of a "z-shaped" cross-section of each of the adjustable support arms 16, 17. The lower lip portions 35 forms a lower edge 33 parallel and opposite to the upper edge 31 of the "z-shaped" cross-section of each of the adjustable support arms 16, 17. The object bracket 14 is mountable to an object using screws inserted through one or more mounting holes 36, 38, 40, 42. Other methods for mounting the object bracket 14 to an object can be used, including such mounting methods as involve glue, adhesive tapes, nails, screws, mechanical devices or other types of fasteners. In other embodiments, the object bracket 14 can be one or more of a balanced or unbalanced inverted arcuate shape, C-, U-, or V-shape, or any other peaked shape.

The substrate bracket 12 assembled with adjustable support arms 16, 17, is mountable to a wall. The adjustable support arms 16, 17 receive the object bracket bottom edge 44. In other embodiments, the adjustable support arms 16, 17 receive a wire 48 (not shown in FIG. 1) attached to an object.

When the substrate and object brackets 12, 14 are used together, an object is suspended on a wall and is levelable by shifting the object laterally via sliding the object bracket bottom edge 44 along the upper channel 30 of the adjustable support arms 16, 17. In alternate embodiments, a leveling adjustment is made by sliding the wire 48 attached to an object along the upper channel 30 of the adjustable support arms 16, 17. Once the object is adjusted to a desired leveling position, the object is adjustable horizontally by sliding both adjustable support arms 16, 17 equally left or right on the substrate bracket 12 in the same direction. Additionally, the object is adjustable vertically by moving both of the adjustable support arms 16, 17 equally left or right on the substrate bracket 12 in opposite directions. These adjustments are not mutually exclusive of one another.

Further details of the interfaces between the various components mentioned above and the operation and adjustability of the wall mountain apparatus 10 will be described below with reference to the other Figures.

Figure 2:
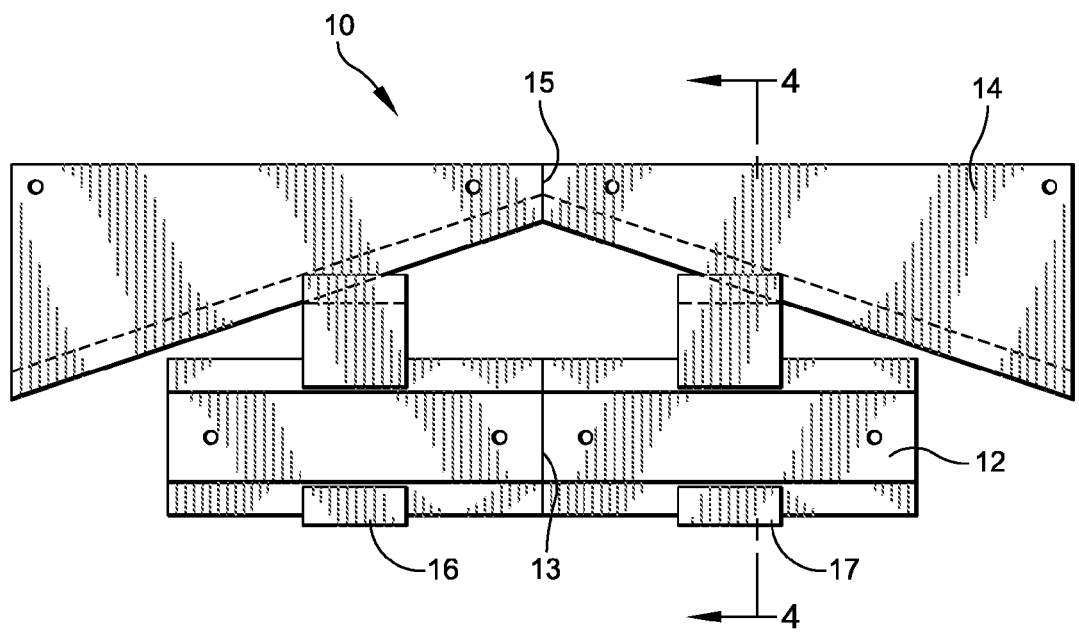
FIG. 2 is the front elevation view of the substrate mounting apparatus of FIG. 1.

With reference now to FIG. 2, a front elevation view of the wall mounting apparatus 10 looking from a wall outwards is shown. The adjustable support arms 16, 17 are slidable along an outside edge, opposite the wall, of the substrate bracket 12, thus allowing lateral movement of the adjustable support arms 16, 17 in relation to a wall without binding occurring between the adjustable support arms 16, 17 and the wall. Similarly, the adjustable support arms 16, 17 slidably mount to the object bracket 14 spaced sufficiently away from the wall to allow for movement of the object bracket 14 with respect to both the adjustable support arms 16, 17 and the substrate bracket 12 without interference from the wall.

Figure 3:
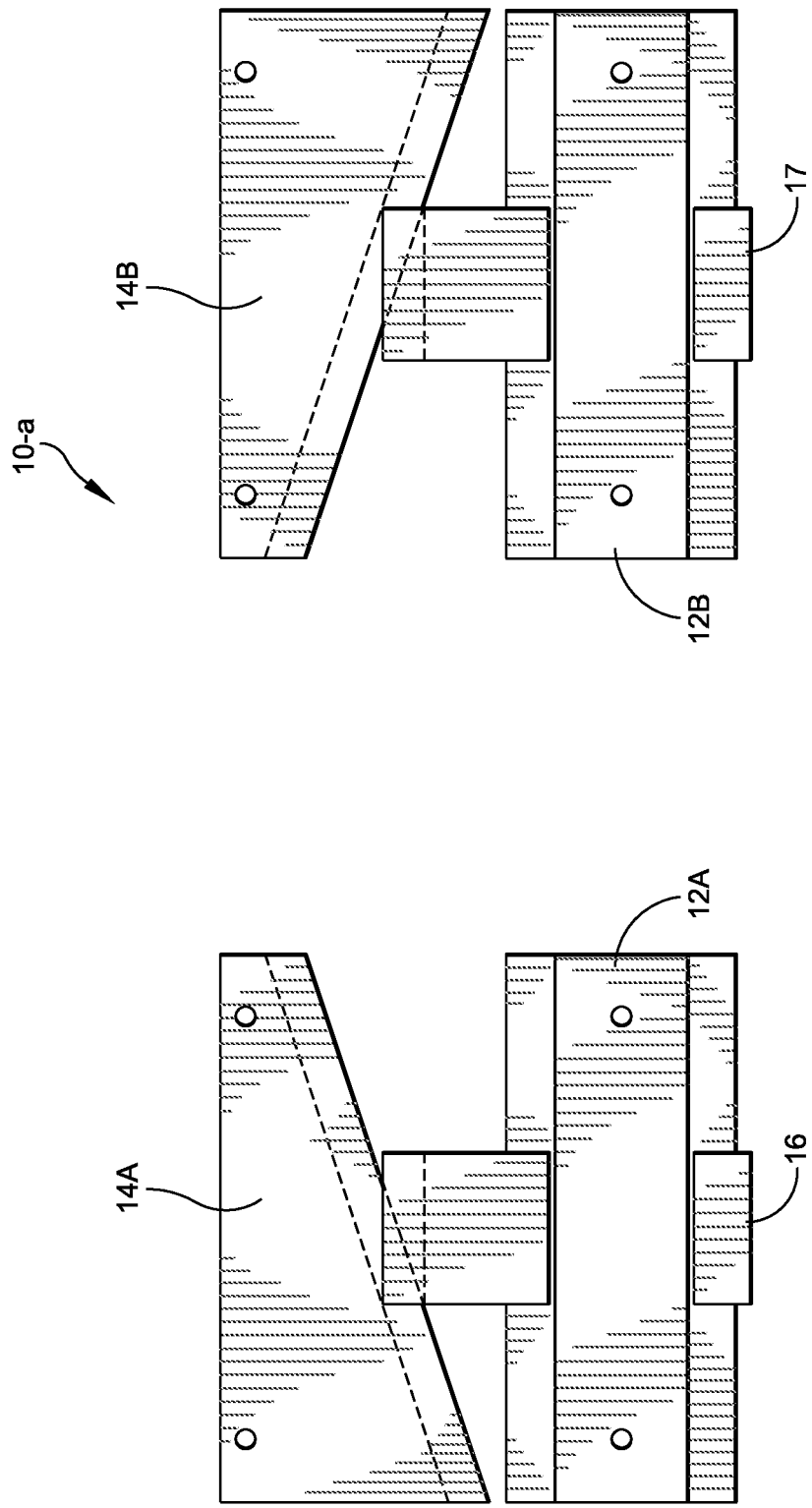
FIG. 3 is a front elevation view of a modified substrate mounting apparatus.

With reference to FIG. 3, an alternate embodiment of the wall mounting apparatus 10-a is shown. The object bracket 14 and the substrate bracket 12 are each separated into two pieces along lateral center lines 15, 13. The separated pieces of the object bracket 14A, 14B are mountable to the outer edges of wider objects while still allowing the same set of simultaneous adjustment capabilities. The separated pieces of the substrate bracket, 12A, 12B, are mountable to a wall to further accommodate object bracket pieces 14A, 14B for wider objects. In some embodiments, object bracket pieces 14A, 14B, and/or substrate bracket pieces 12A, 12B further include stop portions on both lateral ends of (not shown) the object bracket bottom edge 44 and/or of the upper and bottom edges 26, 28 of the substrate bracket 12 to prevent the adjustable support arms 16, 17 from sliding off of the object bracket bottom edge 44 and/or the top and bottom edges 26, 28 of the substrate bracket 12. This further minimizes difficulty and time spent in hanging an object.

The separated pieces of the object bracket, 14A, 14B are formed by separating the object bracket 14 along the object bracket lateral center 15. The separated pieces of the substrate bracket, 12A, 12B are formed by separating the substrate bracket 12 along the substrate bracket lateral center 13. In other embodiments, the separated pieces of the object bracket 14A, 14B and/or the separated pieces of the substrate bracket 12A, 12B, may be formed by different methods.

Figure 4:
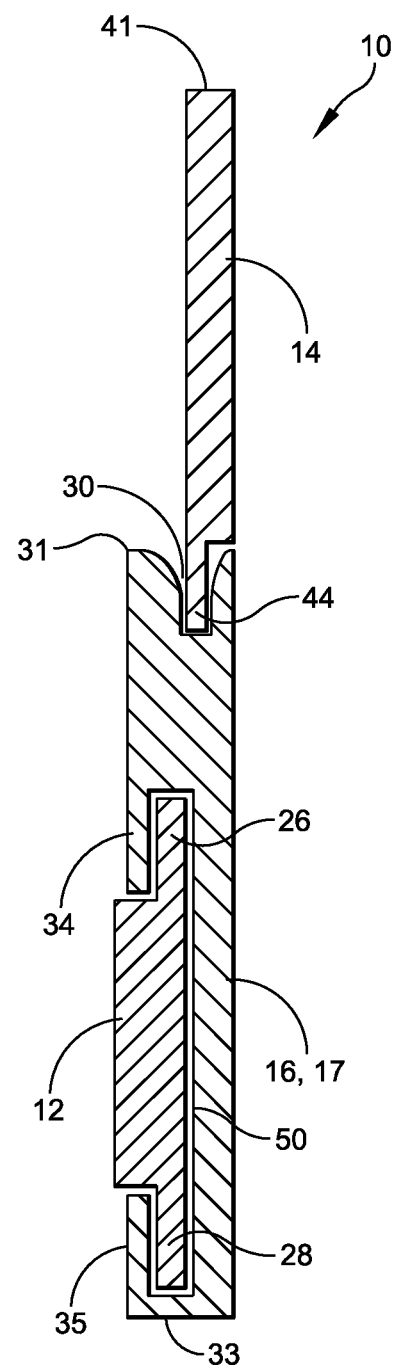
FIG. 4 is a cross-sectional view of the substrate mounting apparatus of FIGS. 1-3 taken along section line 4-4 of FIG. 1.

With reference to FIG. 4, a cross-section of the wall mounting apparatus 10 and 10-a, taken along section line 4-4 of FIG. 1 is shown. Object bracket 14 has an object bracket bottom edge 44 defining a rectangular shaped notch slidably penetrating channel 30 of adjustable support arms 16, 17. The adjustable support arms 16, 17 each have a "z-shaped" cross section, with channel 30 slidably receiving the object bracket bottom edge 44. The upper and lower lip portions 34, 35 of the adjustable support arms 16, 17 slidably engage the top and bottom lips 26, 28 of the substrate bracket 12, with the upper lip portion 34 and a portion of the adjustable support arm back wall 50 surrounding the substrate bracket top edge 26, and the lower lip portion 35 and a portion of the adjustable support arm back wall 50 surrounding the substrate bracket bottom edge 28.

In other embodiments, the object bracket bottom edge 44 can have one or more of a stepped, notched, and/or curved cross-section or any combination thereof to accommodate engagement with the channel 30 of the adjustable support arms 16, 17. Similarly, channel 30 of the adjustable support arms 16, 17 can have various cross-sections to accommodate various configurations of the object bracket bottom edge 44.

In yet other instances, the substrate bracket top and bottom lips 26, 28, and the channel 32 formed by the upper and lower lip portions 34, 35 and the back wall 50 can form a partially rounded, fully rounded, or any other such interface configuration that allows the adjustable support arms 16, 17 to slidably mount the substrate bracket 12.

Figure 5A:
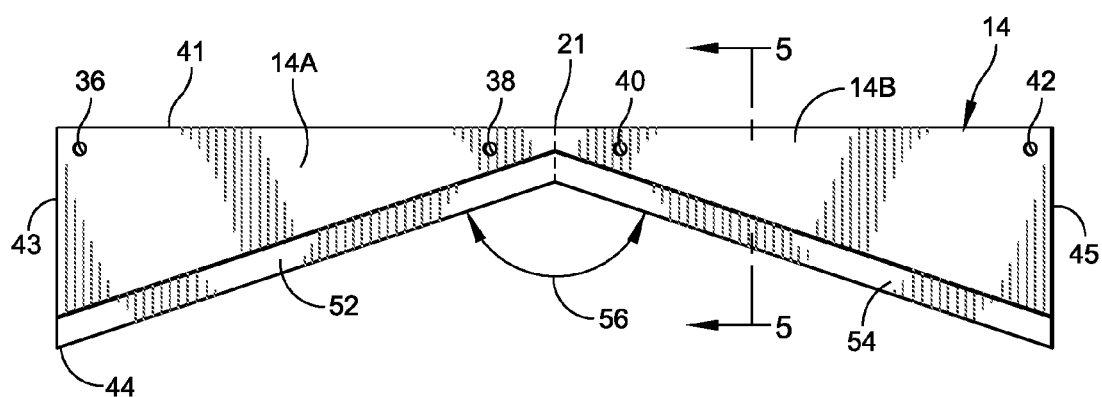
FIG. 5A is front elevation view of the object bracket shown in FIGS. 1-4.
Figure 5B:
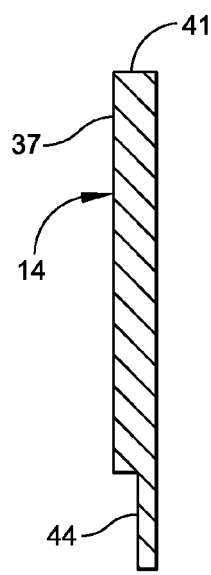
FIG. 5B is a cross-sectional view of the object bracket of FIG. 5A taken along section line 5-5 of FIG. 5A.

With reference now to FIG. 5A and 5B, a reverse v-shaped object bracket 14 has a concave object bracket lower edge 44 defining a first sloped channel 52 and a second sloped channel, with the second sloped channel 54 being at an angle 56 to the first sloped channel 52. The first and second sloped channels 52, 54 are opposite the upper object bracket upper edge 41, with both the first and second sloped channels 52, 54 and the object bracket upper edge 41 being transverse to vertical object bracket edges 43, 45, which are parallel and opposite to one another. The first and second sloped channels 52, 54 define a vertical dimension of the object bracket 14 such that at object bracket center 21, the vertical dimension is less than both vertical edges 43, 45 of the object bracket 14. The object bracket 14 has a rectangular main portion 37 in cross-section having a width greater than the notched object bracket lower edge 44, with the object bracket lower edge 44 extending vertically from the rectangular main portion 37. It should be appreciated that the term channel does not necessitate a concave portion or a groove, but may include any shape capable of slidably engaging another object, such as a notch, a step, etc.

In the embodiment shown, the angle 56 is equal to 150 degrees. However, it should be appreciated that the angle 56 can be altered by 10%, 20%, 30%, 40%, 50%, etc. by various increments to a minimum of approximately 5 degrees and a maximum of approximately 179 degrees to further allow for increased adjustability, accommodation of wider or narrower objects, etc. Also in the embodiment shown, vertical edges 43, 45 are 1 inch in length, and the object bracket 14 is 5 inches wide and 3/16 inches thick, with the object bracket lower edge 44 being 1/16 inches thick. However, it should be appreciated that the dimensions of the object bracket 14 can be altered by 10%, 20%, 30%, 40%, 50%, etc. up to 100%, 200%, 500%% etc. by various increments to further provide for increased adjustability, accommodation of wider or narrower objects, etc.

Figure 6A:
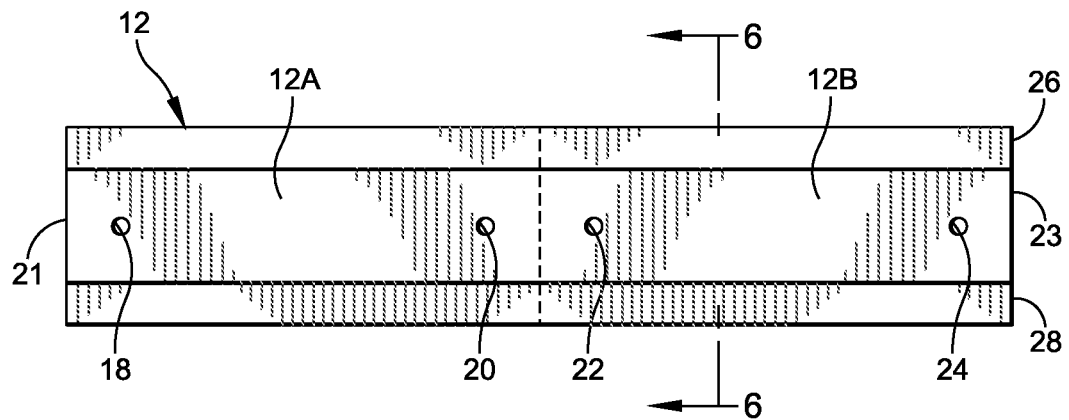
FIG. 6A is a front elevation view of the substrate bracket shown in FIGS. 1-4.
Figure 6B:
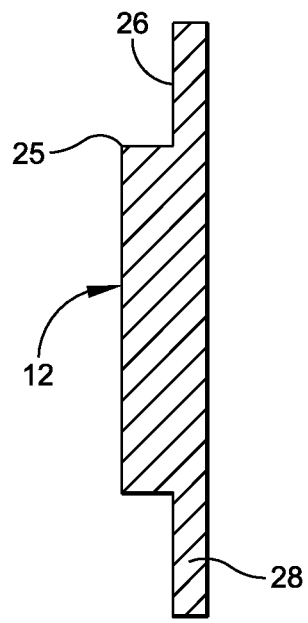
FIG. 6B is a cross-sectional view of the substrate bracket of FIG. 6A taken along section line 6-6 of FIG. 6A.

With reference now to FIGS. 6A and 6B, an elongated substrate bracket 12 has top and bottom edges 26, 28 each defining a notched or stepped cross-section to slidably engage the adjustable support arms 16, 17. The top and bottom edges 26, 28 are both transverse to vertical substrate bracket edges 21, 23, where the vertical substrate bracket edges 21, 23 are opposite and parallel to one another. The substrate bracket 12 has a rectangular main body 25 in cross-section, with the top and bottom edges 26, 28 having a smaller width dimension in cross-section than the rectangular main body 25, each vertically extending from the rectangular main body 25 in opposite directions. It should be appreciated that any other shaped cross-section of the substrate bracket 12 can be used that is capable of slidably mounting the adjustable support arms 16, 17.

In the embodiment shown, the substrate bracket top and bottom edges 26, 28 are both 4 inches in length, the vertical substrate bracket edges 21, 23 are both 5/7 inches in length, and the substrate bracket 12 is 3/16 inches thick, with the substrate bracket top and bottom edges both being 1/16 inches thick. However, it should be appreciated that the dimensions of the substrate bracket 12 can be altered by 10%, 20%, 30%, 40%, 50%, etc. up to 100%, 200%, 500%% etc. by various increments to further provide for increased adjustability, accommodation of wider or narrower objects, etc.

Referring now to FIGS. 7A and 7B, a more detailed view of an adjustable support arm 16, 17 is shown. The lower adjustable support arm edge 33 defines a horizontal member 39. In conjunction with lower lip 35 and back wall 50, the horizontal member 39 provides a lower portion of the lower channel 32, with the upper lip 34 and back wall 50 defining an upper portion of lower channel 32.

In the embodiment shown, the adjustable support arms 16, 17 both have a vertical dimension of 1 inch, a horizontal dimension of ½ inches, and are ¼ inches thick in total dimension, with the upper and lower lips 34, 35, horizontal member 39, and back wall 50 all being approximately 1/16 inches thick. However, it should be appreciated that the dimensions of adjustable support arms 16, 17 can be altered by 10%, 20%, 30%, 40%, 50%, etc. up to 100%, 200%, 500%% etc. by various increments to further provide for increased adjustability, accommodation of wider or narrower objects, to better accommodate different sizes of the object bracket 14, and/or substrate bracket 12, etc.

Figure 8A:
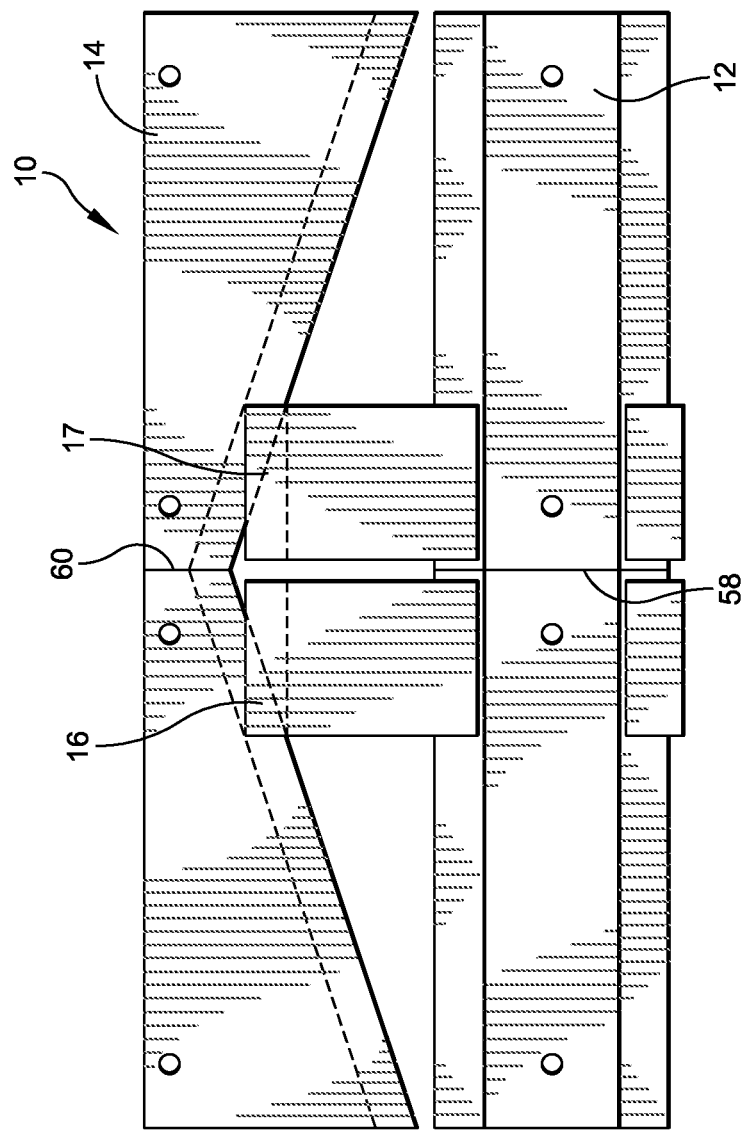
FIG. 8A is a front elevation view of the substrate mounting apparatus shown in FIGS. 1-4.

With reference to FIG. 8A, the wall mounting apparatus 10 is shown with the object bracket 14 positioned at a minimum height relative to the substrate bracket 12. This vertical position is achievable by moving the adjustable support arms 16, 17 laterally along the substrate bracket 12 closer to one another towards the lateral center 58 of the substrate bracket 12. By also moving the adjustable support arms 16, 17 to the lateral center 60 of the reverse v-shaped object bracket 14, a minimum height is achievable relative to the substrate bracket 12. Leveling or tilting is effectuated by moving the adjustable support arms 16, 17 along the object bracket 14 different lateral distances from the object bracket lateral center 60. Adjustments to the horizontal, vertical, tilt, and leveling position of the object, as described above, are independent of one another.

With reference to FIG. 8B, the wall mounting apparatus 10 is shown in a different lateral and vertical position from the configuration described in reference to FIG. 8A. By moving the adjustable support arms 16, 17 different lateral distances from the substrate bracket center 58, lateral position of the object bracket 14, and hence an object, are effectuated. Further, by moving the adjustable support arms 16, 17 a greater distance apart from one another, particularly along the object bracket 14, an independent height adjustment of the object bracket 14 relative to the substrate bracket 12 is effectuated.

In the embodiments shown with the above-described dimensions, an object can be adjusted a total of 2 inches horizontally, ½ inches vertically, and titled up to 30 degrees relative to the substrate. However, it should be appreciated that with a different sized object bracket 14, substrate bracket 12, and/or adjustable support arms 16, 17, the adjustment capabilities of the substrate mounting apparatus may be expanded or decreased by 10%, 20%, 30%, 40%, 50% etc. up to 100%, 200%, 500% etc. by various increments to further provide for different sized objects, more adjustability, etc.

Figure 9A:
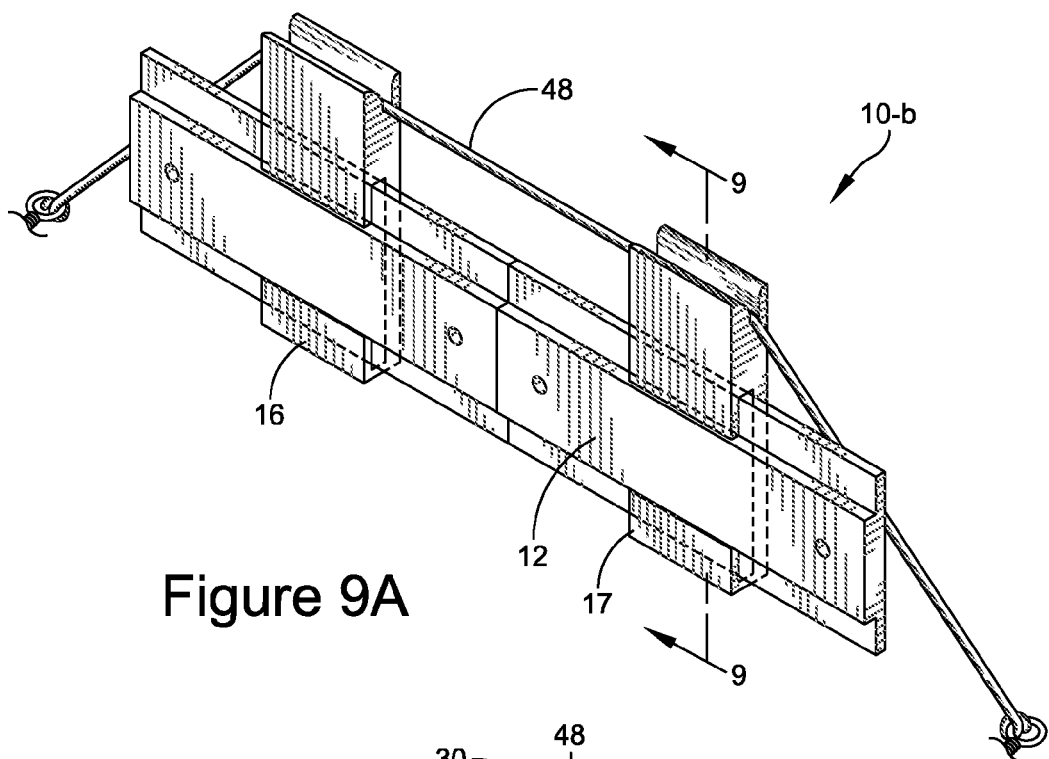
FIG. 9A is a perspective view of another embodiment of a substrate mounting apparatus.
Figure 9B:
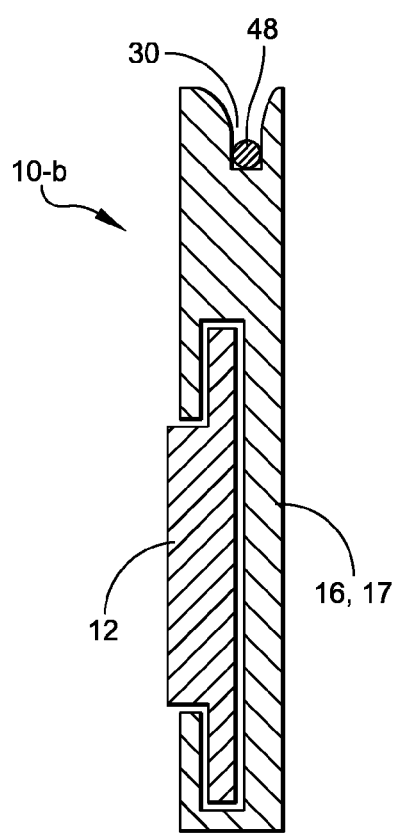
FIG. 9B is a cross-sectional view of the substrate mounting apparatus of FIG. 9A taken along section line 9-9 of FIG. 9A.

Referencing FIGS. 9A and 9B, another embodiment of the wall mounting apparatus 10-b is shown with the channel 30 of the adjustable support arms 16, 17 slidably receiving a wire 48, which is connected to an object to be suspended. In this embodiment, the wire 48 is received by the adjustable support arms 16, 17 in place of an object bracket 14. It should be appreciated that the same independent adjustability in the horizontal or lateral, vertical, and tilt or leveling positions is achievable using the same techniques as described above with the wire 48 in place of the object bracket 14. The object bracket 12 and adjustable support arms 16, 17 have the same dimensions and characteristics as these components described above.

Figure 10A:
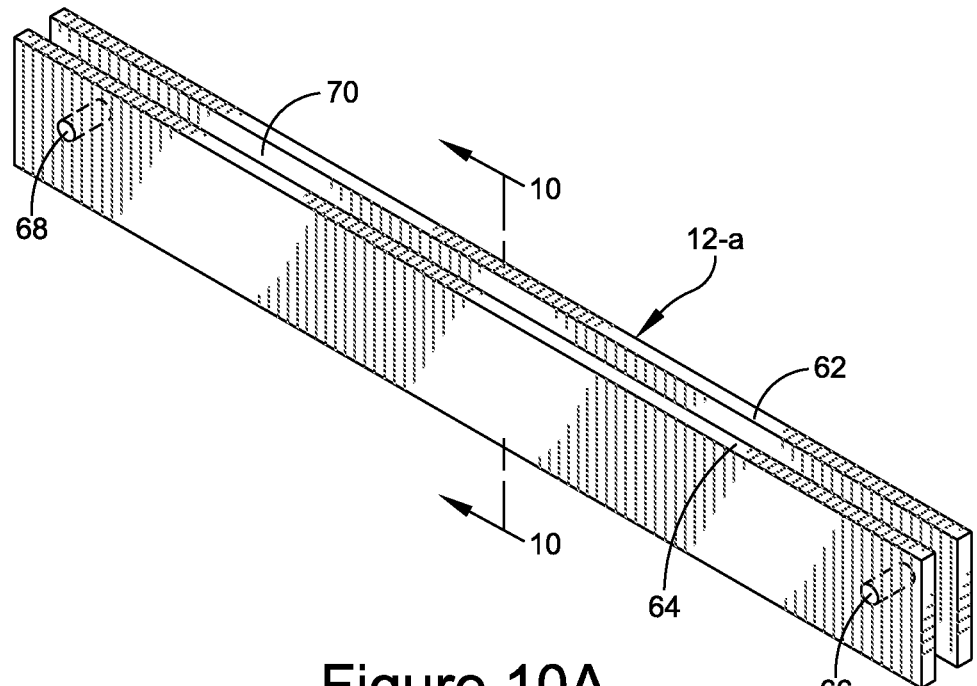
FIG. 10A is a perspective view of the substrate bracket shown in FIGS. 9A and 9B.
Figure 10B:
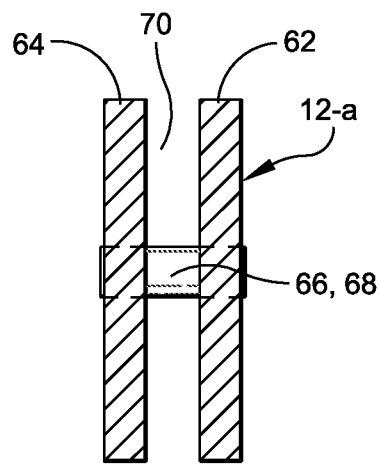
FIG. 10B is cross-sectional view of the substrate bracket of FIG. 10A taken along section line 10-10 of FIG. 10A.
Figure 11A:
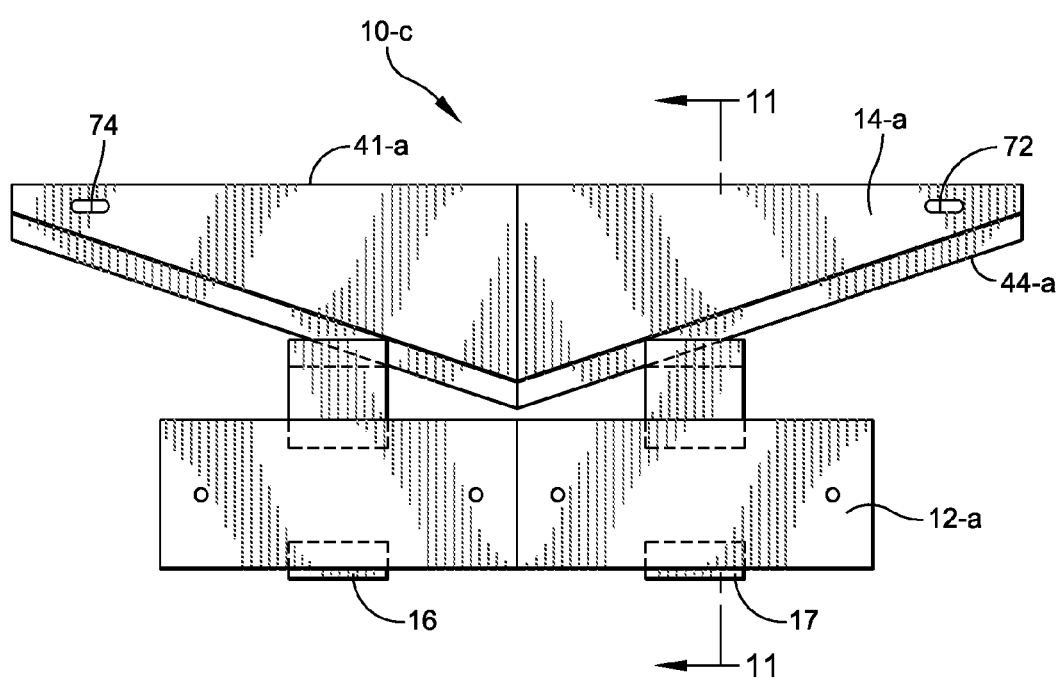
FIG. 11A is a front elevation view of another embodiment of a substrate mounting apparatus.
Figure 11B:
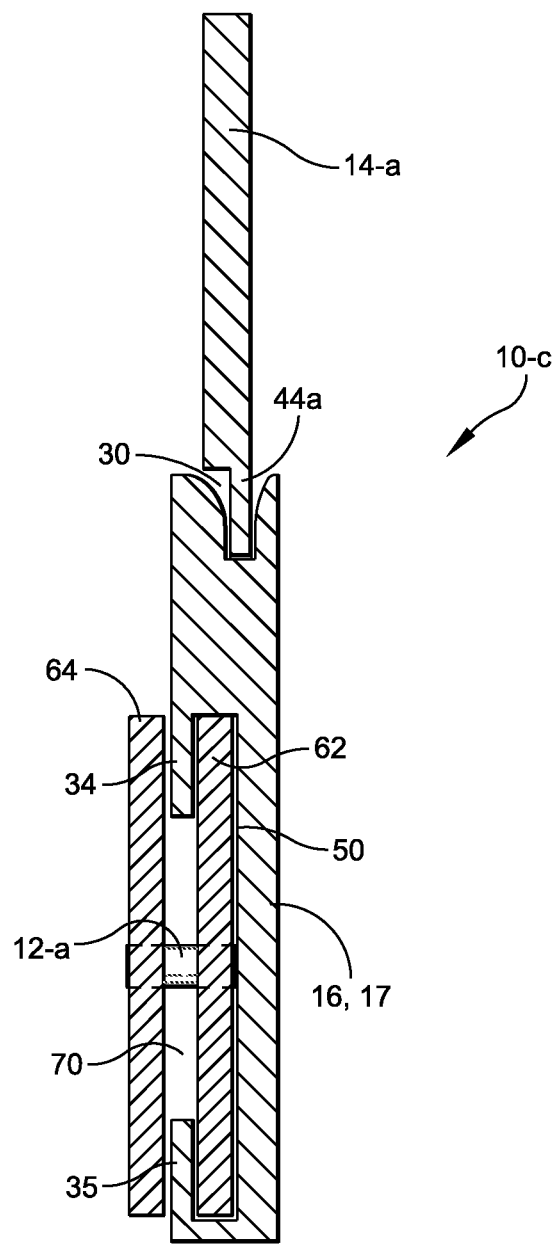
FIG. 11B is a cross-sectional view of the substrate mounting apparatus of FIG. 11A taken along section line 11-11 of FIG. 11A.
Figure 12A:
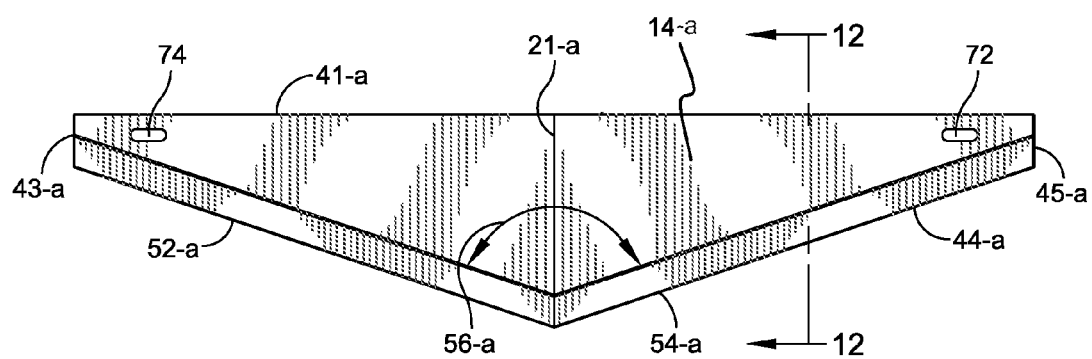
FIG. 12A is a front elevation view of an object bracket shown in FIGS. 11A and 11B.
Figure 12B:
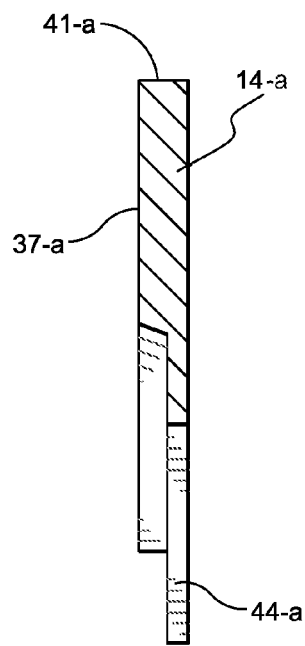
FIG. 12B is a cross-sectional view of the object bracket shown of FIG. 12A taken along section line 12-12.

With reference to FIGS. 10A and 10B, another embodiment of the substrate bracket 12-a has a first parallel plate 62 and a second parallel plate 64 coupled to each other by connecting members 66, 68. The first parallel plate 62 and the second parallel plate 64 each define a planar rectangle having the same height, width, and thickness. The parallel plates 62, 64 form a channel 70 therebetween that is slidably mountable to adjustable support arms 16, 17. It should be appreciated that substrate bracket 12-a can be used in any of the embodiments of the wall mounting apparatus 10 described with only slight modification and without departing from the spirit and scope of this disclosure. Substrate bracket 12-a is capable of suspending objects of greater weight due to the increased contact area between the adjustable support arms 16, 17 and the substrate bracket 12-a. In some embodiments, the placement, number, size, and/or shape of the parallel plates 62, 64 and/or the connecting members 66, 68 can be varied to accommodate various objects of different sizes and weights, etc.

In reference to FIGS. 11A, 11B, 12A, and 12B, another embodiment of the wall mounting apparatus 10-c is shown, with a flat v-shaped object bracket 14-a. It should be appreciated that the object bracket 14-a can also be one or more of a balanced or unbalanced arcuate shape, a C-, U-, or V-shape, or any other peaked shape. The object bracket 14-a has an object bracket bottom edge 44-a defining a notched or stepped cross-section slidably penetrating the upper channel 30 of the adjustable support arms 16, 17. The adjustable support arms 16, 17 each have a z-shaped cross-section slidably mountable to the substrate bracket 12-a, as described above in reference to FIGS. 10A and 10B. The channel 70 formed by the parallel plates 62, 64 slidably surrounds the upper and lower front lip portions 34,35 of the adjustable support arms 16, 17, with the back wall 50 and the upper and lower front lip portions 34,35 of the adjustable support arms 16, 17 partially and slidably surrounding the parallel plate 62.

The object bracket 14-a has an upper edge 41-a opposite the object bracket bottom edge 44-a, which is defined by a first sloped channel 52-a continuous with a second sloped channel 54-*a*, where the first sloped channel 52-*a* is at an angle 56-*a* to the second sloped channel 54-*a*. The object bracket 14-*a* has two vertical edges 43-*a*, 45-*a*, which are parallel and opposite to one another and transverse to the upper edge 41-*a* and the object bracket bottom edge 44-*a*. The object bracket 14-*a* has a greatest height or vertical dimension at its lateral center 21-*a*. The object bracket 14-*a* has two mounting holes 72, 74 proximal to and along the upper edge 41-*a*, which may correspond to any of the mounting holes 36, 38, 40, 42 as described above, to allow, for example, for easier mounting to a lighter weight object requiring less support strength. The object bracket 14-*a* has a rectangular main portion 37-*a* in cross-section having a width greater than the notched object bracket lower edge 44-*a*, with the object bracket lower edge 44-*a* extending vertically from the rectangular main portion 37-*a*. The operation and adjustability of the wall mounting apparatus 10-*c* is similar to that described above in reference to FIGS. 1-10B.

Figure 13:
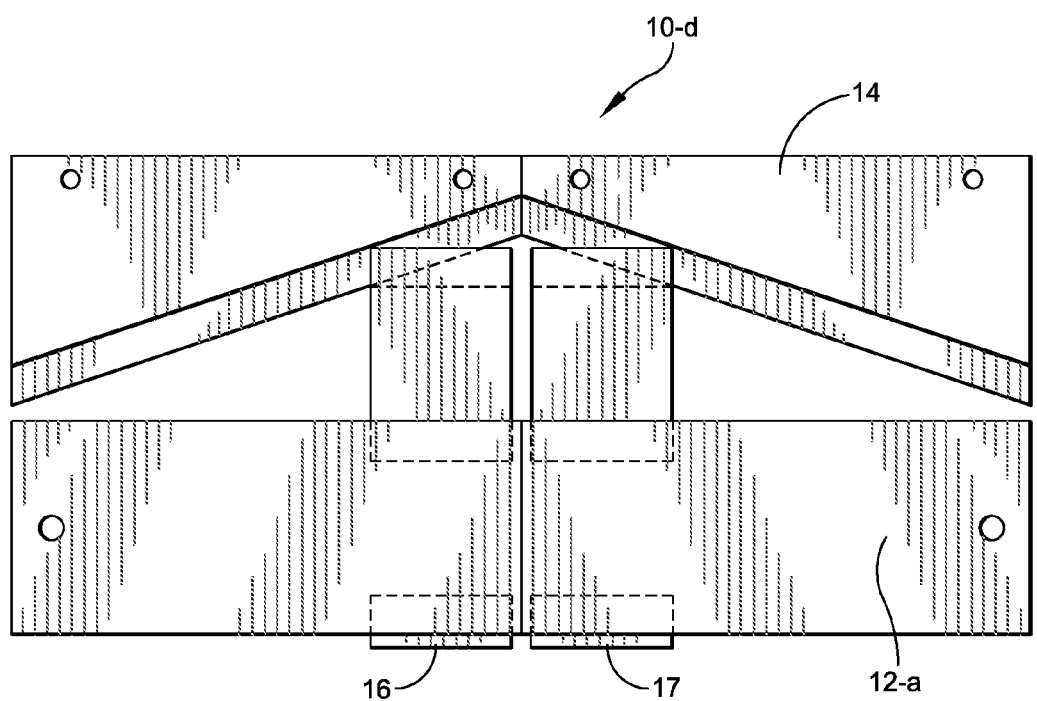
FIG. 13 is a front elevation view of another embodiment of a substrate mounting apparatus.
Figure 14:
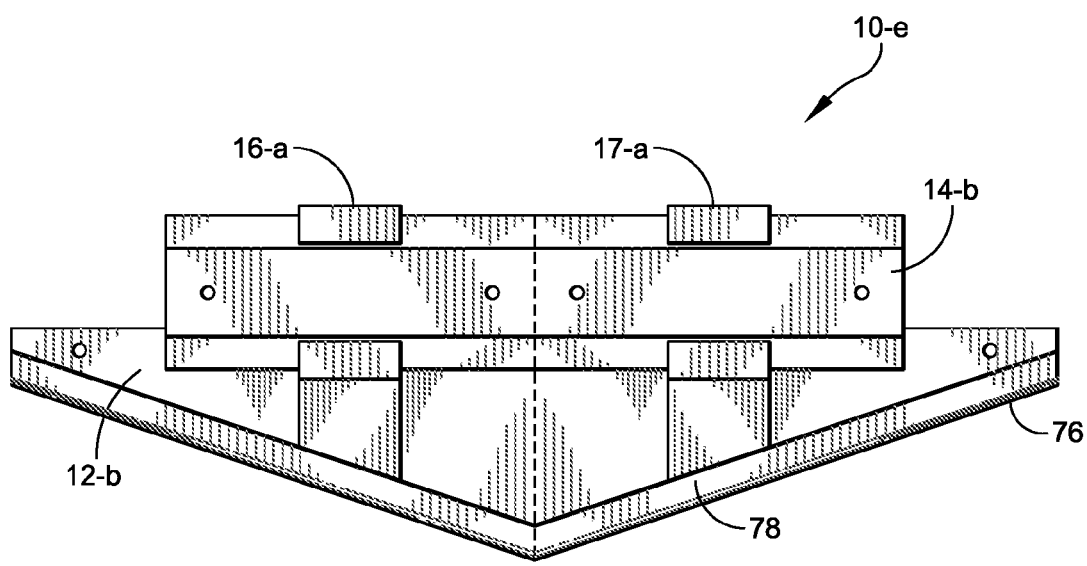
FIG. 14 is a front elevation view of yet another embodiment of a substrate mounting apparatus.

With reference to FIG. 13, an alternate embodiment of the wall mounting apparatus 10-*d* is shown with the object bracket 14 described in reference to FIGS. 1-8B, and the substrate bracket 12-*a* described in reference to FIGS. 10A-11B, both slidably mountable to the adjustable support arms 16, 17.

With reference now to FIGS. 14-20B, another embodiment of the wall mounting apparatus 10-*e*, 10-*f* has a v-shaped substrate bracket 12-*b*, which can also be one or more of a balanced or unbalanced inverted arcuate shape, a C-, U-, or V-shape, or any other peaked shape, with a convex lower substrate bracket edge 76 defining a rounded channel 78. Adjustable support arms 16-*a*, 17-*a* have a rounded lower edge 100, 101 slidably penetrating the substrate bracket rounded channel 78. The adjustable support arms 16-*a*, 17-*a* each have upper and lower lip portions 82, 84 that define a cavity 104 that slidably receives the top and bottom object bracket edges 86, 88 of the object bracket 14-*b*. The objet bracket 14-*b* has the same configuration and dimensions as substrate bracket 12, as described above in reference to FIGS. 1-9B.

Figure 15:
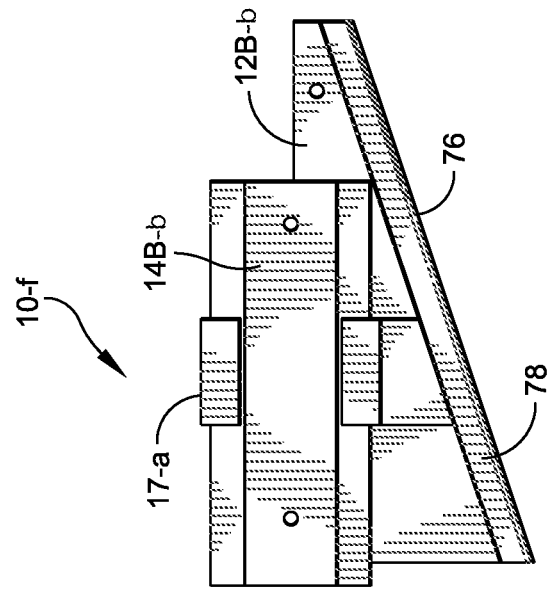
FIG. 15 is a front elevation view of a modified substrate mounting apparatus.
Figure 15:
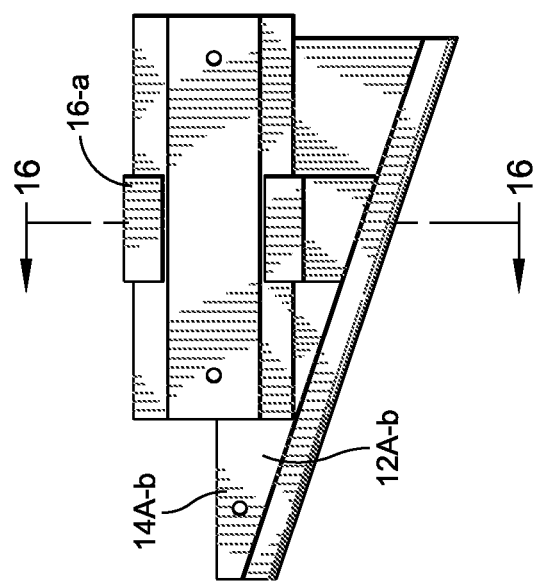
Figure 16:
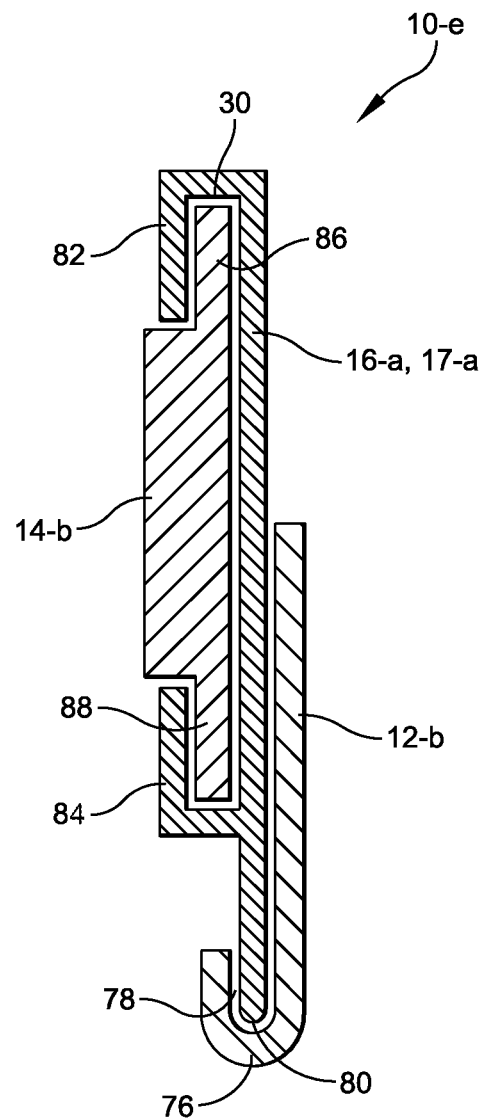
FIG. 16 is a cross-sectional view of the substrate mounting apparatus shown in FIGS. 14 and 15 taken along section line 16-16 of FIG. 15.

With reference to FIG. 15 in particular, an alternate embodiment of the wall mounting apparatus 10-*f* is shown with the object bracket 14-*b* and the substrate bracket 12-*b* separated each into two pieces. The separated pieces of the object bracket 14A-b, 14B-b are mountable to the outer edges of wider objects while still allowing the same set of simultaneous adjustment capabilities. The separated pieces of the substrate bracket, 12A-b, 12B-b, are mountable to a wall to further accommodate object bracket pieces 14A-b, 14B-b for wider objects. In some embodiments, object bracket pieces 14A-b, 14B-b, and/or substrate bracket pieces 12A-b, 12B-b further include stop portions (not shown) at the ends of the substrate bracket lower edge 76 and of the top and bottom object bracket edges 86, 88 to prevent the adjustable support arms 16-*a*, 17-*a* from sliding off of the substrate bracket lower edge 76 and/or top and bottom object bracket edges 86, 88. This further minimizes difficulty and time spent in hanging an object.

Figure 17A:
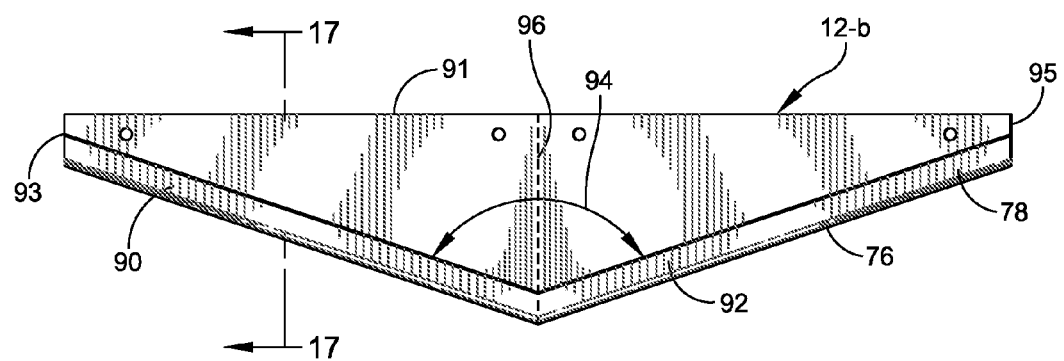
FIG. 17A is a front elevation view of a substrate bracket shown in FIGS. 14-16.
Figure 17B:
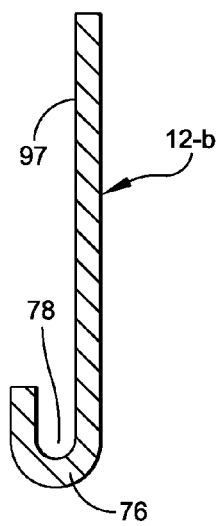
FIG. 17B is a cross-sectional view of the substrate bracket of FIG. 17A taken along section line 17-17 of FIG. 17A.

In reference to FIGS. 17A and 17B in particular, the substrate bracket 12-*b* has a curved channel 78, which further defines a first sloped channel 90 and a second sloped channel 92, with the second sloped channel 92 being at an angle 94 to the first sloped channel 90. The first and second sloped channels 90, 92 are opposite a substrate bracket upper edge 91, with both the first and second sloped channels 90, 92 and the substrate bracket upper edge 91 being transverse to vertical substrate bracket edges 93, 95, which are parallel and opposite to one another. The first and second sloped channels 90, 92 define a vertical dimension of the substrate bracket 12-*b* such that at substrate bracket center 96, the vertical dimension is less than at both vertical edges 93, 95 of the substrate bracket 12-*b*. The substrate bracket 12-*b* has an elongated rectangular main portion 97 in cross-section with the curved channel 78 extending from the elongated rectangular main portion 97 defining a 180 degree curved portion also in cross-section. It should be appreciated that the term channel does not necessitate a concave portion, a groove, or a particular shape, but may include any shape capable of slidably engaging another object, such as a notch, a step, etc. The substrate bracket 12-*b* shares structural similarities and dimensions with the substrate bracket 12 described above in reference to FIGS. 1-9B, including mounting holes 18, 20, 22, 24, etc.

In the embodiment shown, the angle 94 is equal to 150 degrees. However, it should be appreciated that the angle 94 can be altered by 10%, 20%, 30%, 40%, 50%, etc. by various increments to a minimum of approximately 5 degrees and a maximum of approximately 179 degrees to further allow for increased adjustability, accommodation of wider or narrower objects, etc.

The separated pieces of the substrate bracket, 12A-b, 12B-b as described in reference to FIG. 15 above, are formed by separating the substrate bracket 12-*b* along the substrate bracket lateral center 96.

Figure 18A:
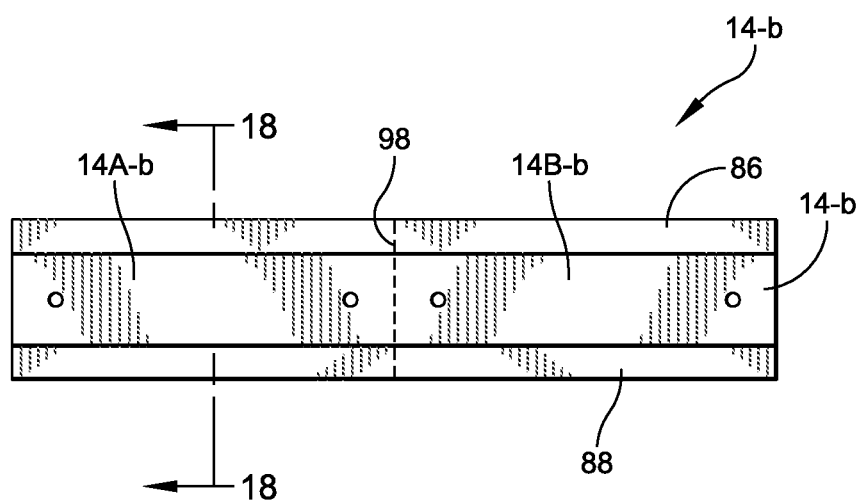
FIG. 18A is a front elevation view of an object bracket shown in FIGS. 14-16.
Figure 18B:
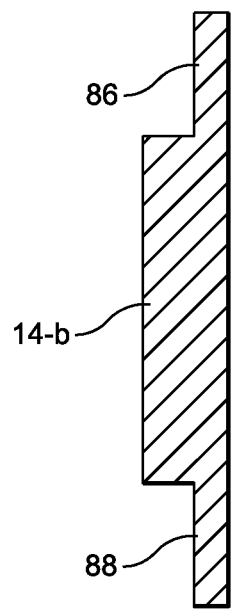
FIG. 18B is a cross-sectional view of the object bracket of FIG. 18A taken along section line 18-18 of FIG. 18A.

In reference to FIGS. 18A and 18B in particular, the object bracket 14-*b* is shown. The object bracket 14-*b* may be identical in dimension to the substrate bracket 12 described above in reference to FIGS. 1-9B. The separated pieces of the object bracket, 14A-b, 14B-b as described in reference to FIG. 15 above, are formed by separating the object bracket 14-*b* along the object bracket lateral center 98. In other embodiments, the substrate brackets 12A-b, 12B-b and the object brackets 14A-b, 14B-b may be formed by other techniques.

Figure 19A:
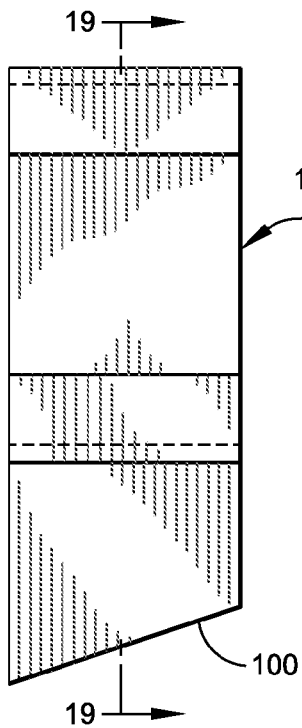
FIG. 19A is a front elevation view of a first adjustable support arm shown in FIGS. 14-16.
Figure 19B:
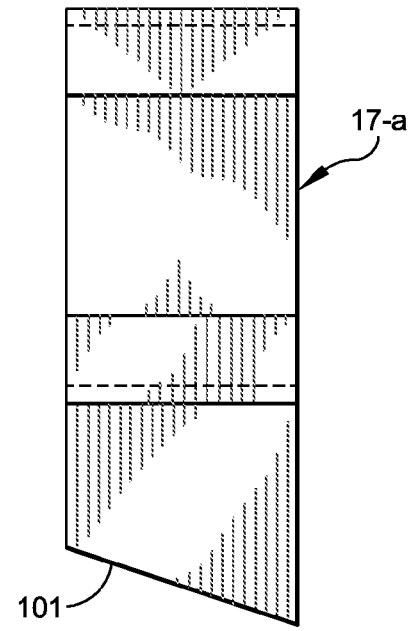
FIG. 19B is a front elevation view of a second adjustable support arm shown in FIGS. 14-16.
Figure 19C:
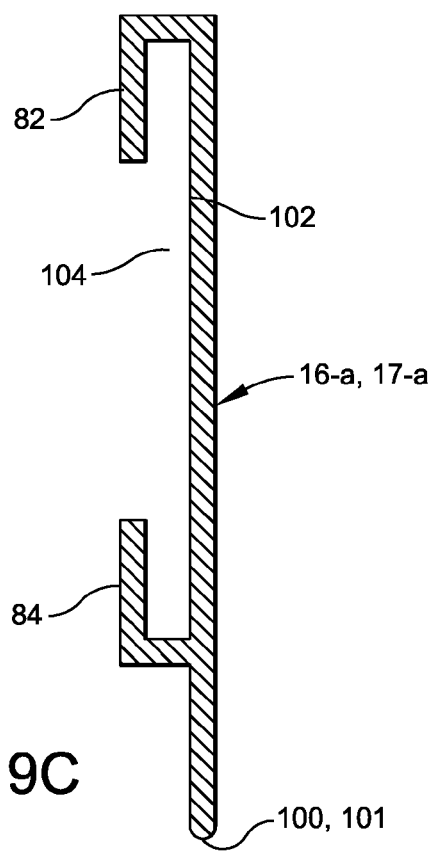
FIG. 19c is a cross-sectional view of the adjustable support arm of FIGS. 19A and 19B taken along section line 19-19.

Referencing now FIGS. 19A-19C in particular, adjustable support arms 16-*a*, 17-*a* each have upper and lower lip portions 82, 84, that in combination with a back wall 102 form a cavity or channel 104 capable of slidably engaging the top and bottom object bracket edges 86, 88 of the object bracket 14-*b*, as described above in reference to FIGS. 1-9B. The adjustable support arms 16-*a*, 17—have a rounded lower edge 100, 101. However, it should be appreciated that the present disclosure also contemplates other cross-sections of lower edge 100, 101, such as square, tapered, stepped, etc. It should also be appreciated that the substrate bracket curved channel 78 can also include various shapes and configurations to accommodate the various embodiments of the lower edges 100, 101 of the adjustable support arms 16-*a*, 17-*a*.

The adjustable support arm 16-*a* has a sloped lower edge 100 that is slidable penetrable in the curved channel 78 of the substrate bracket 12-*b*. The adjustable support arm 17-*a* similarly has a sloped lower edge 101 that is slidably penetrable in the curved channel 78 of the substrate bracket 12-*b*. Sloped lower edges 100, 101 provide for a more stable platform upon which to mount an object, for example, by providing more friction to resist unwanted movement of the adjustable support arms 16-*a*, 17-*a* with respect to the substrate bracket 12-*b*. In other embodiments, the lower edges 100, 101 of the adjustable support arms 16-*a*, 17-*a* can be square, tapered, stepped, or any other such configuration.

Figure 20A:
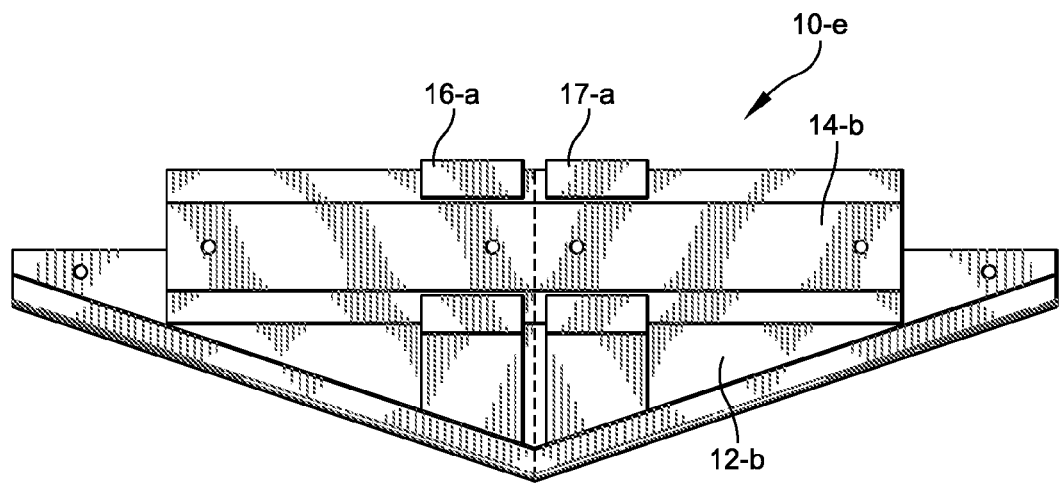
FIG. 20A is a front elevation view of the substrate mounting apparatus shown in FIGS. 14 and 16.

With reference in particular to FIG. 20A, the wall mounting apparatus 10-*e* is adjusted to a lowest object height position by moving the adjustable support arms 16-*a*, 17-*a* towards each other and towards the lateral substrate bracket center 96. It should be appreciated that by moving the adjustable support arms 16-*a*, 17-*a* away from each other and away from the lateral substrate bracket center 96, that the object bracket 14-*b*, and hence the object will be raised in relation to the substrate bracket 12-*b*. This allows lateral adjustment by sliding the object bracket 14-*b* laterally relative to the adjustable support arms 16-*a*, 17-*a*.

It should be appreciated that the wall mounting apparatus 10-*e* is adjustable in a similar fashion as that described above with reference to FIGS. 8A and 8B, with the predominant difference being that the movement of the adjustable support arms 16-*a*, and 17-*a* is flipped with respect to the objet bracket 14-*b* and the substrate bracket 12-*b* for the various adjustments.

Figure 20B:
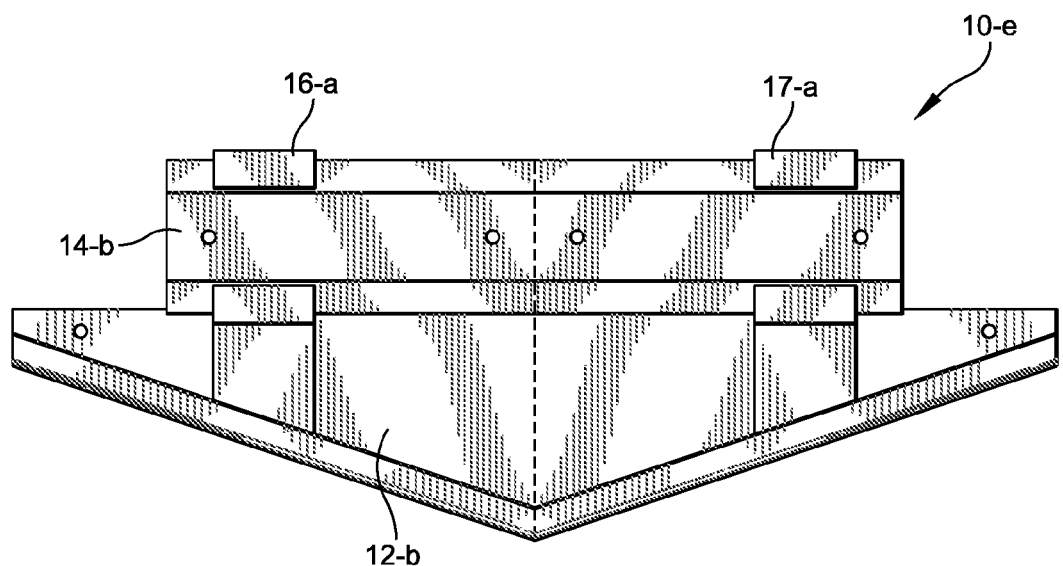
FIG. 20B is a front elevation view of the substrate mounting apparatus shown in FIGS. 14 and 16.

With reference in particular to FIG. 20B, the wall mounting apparatus 10-*e* is adjusted to a highest object height position by moving the adjustable support arms 16-*a*, 17-*a* away from each other and away from the lateral substrate bracket center 96.

Figure 21:
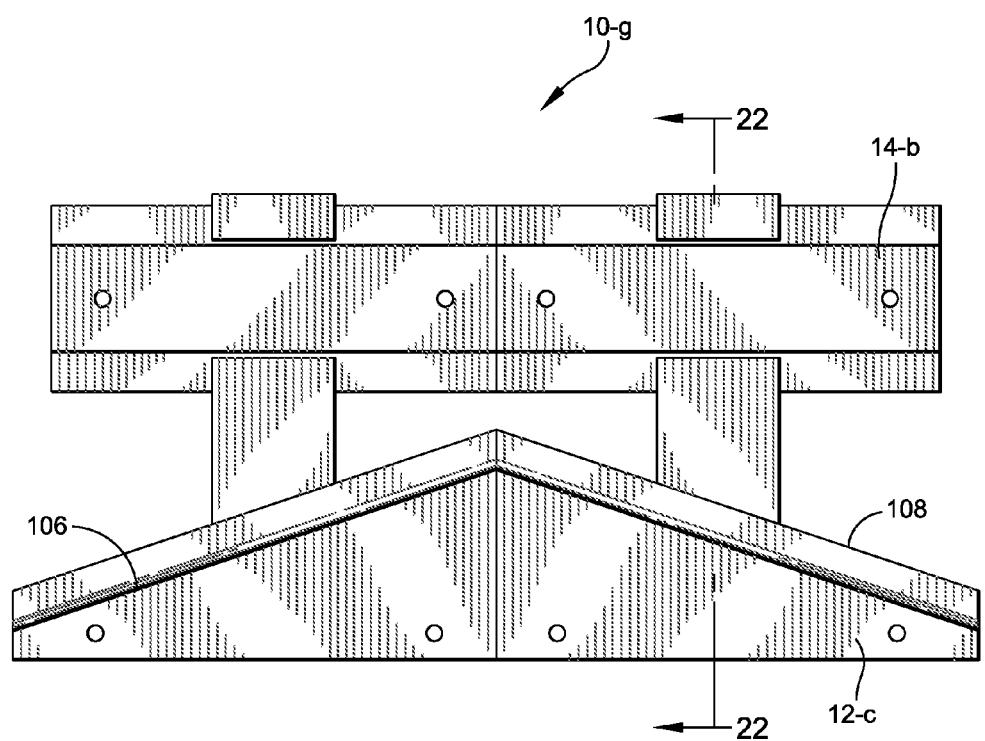
FIG. 21 is a front elevation view of a modified substrate mounting apparatus.
Figure 22:
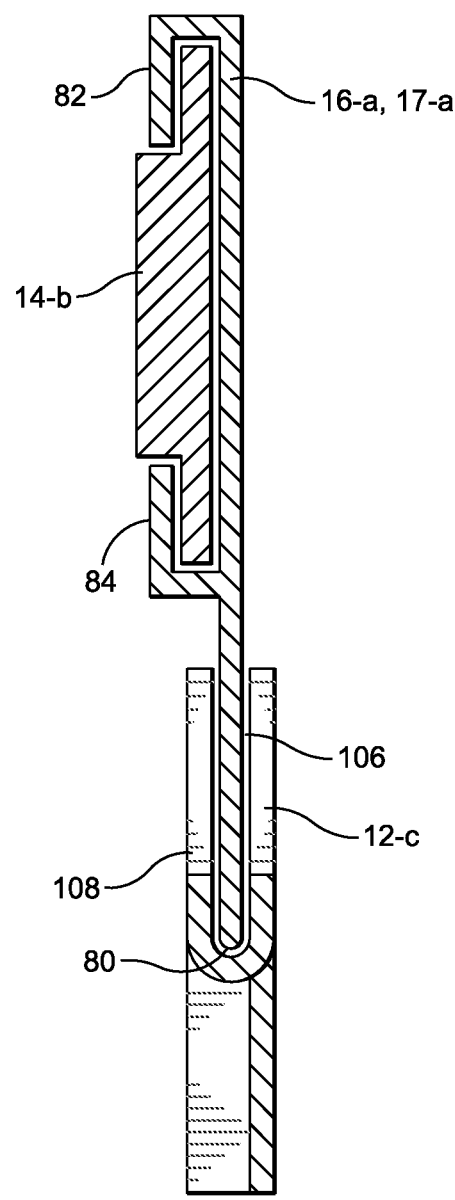
FIG. 22 is a cross-sectional view of the substrate mounting apparatus of FIG. 21 taken along section line 22-22 of FIG. 21.

In reference to FIGS. 21 and 22, an alternate embodiment of the wall mounting apparatus 10-*g* is shown with the object bracket 14-*b*, as described above in reference to FIGS. 14-20B, slidably mounting adjustable support arms 16-*b*, 17-*b*. The adjustable support arms 16-*b*, 17-*b* slidably penetrate an upper substrate bracket channel 106 that is at least partially defined by an upper substrate bracket edge 108 of the substrate bracket 12-*c*. The physical interface between the substrate bracket 12-*c*, the object bracket 14-*b*, and the adjustable support arms 16-*b*, 17-*b* is similar to the interface described above with respect to like components. In other embodiments, the cross-sections of the substrate bracket 12-*c*, the object bracket 14-*b*, and the adjustable support arms 16-*b*, 17-*b* can be different to accommodate different sizes, weights etc. of the object to be suspended.

The wall mounting apparatus 10 generally is constructed of one or more types of plastic or other synthetic types of material. The type of plastic can be varied to accommodate objects of varying sizes, weights, and shapes. In some embodiments, the wall mounting apparatus 10 generally can be constructed of a metal. The gauge and type of the metal can be varied to accommodate objects of varying sizes, weights, and shapes. In certain embodiments, the wall mounting apparatus 10 generally can be constructed of one or more other types of materials such as wood. The gauge, type and configuration of the materials can be varied to accommodate objects of varying sizes, weights, and shapes.

All components and subcomponents can be manufactured using various materials, such as rigid materials, including those described above. In some embodiments, the object bracket 14 is constructed from materials different than those used to construct the substrate bracket 12. In another embodiment, the support arms 16, 17 are constructed of materials different from the brackets.

Another embodiment of the instant disclosure relates to a method for suspending objects and adjusting the object's level or tilt, lateral position and vertical position. The method is performed as follows:

1. attaching the substrate bracket 12 to a vertical, or upwardly inclined, substrate;
2. attaching the object bracket 14 to the center of the object;
3. slidably mounting the adjustable support arms 16, 17 on the substrate bracket 12;
4. inserting the object bracket bottom edge 44, or alternatively a wire 48 attached to an object, into the channel 30 of the adjustable support arms 16, 17.
5. leveling or tilting the object by sliding the object laterally left or right in the channel 30 of the adjustable support arms 16, 17, while the adjustable support arms 16, 17 remain stationary, until a level or desired title setting is achieved. Leveling or tilting is also achievable by sliding one adjustable support arm 16, 17 left or right by a distance greater than or less than the sliding distance of the other support arm 17, 16, which will cause one side of the object bracket 14 or wire 48 to rise while the other side will lowers, thus allowing the object to achieve a desired position;
6. laterally positioning the object by moving both adjustable support arms 16, 17 in the same direction along the substrate bracket 12 equal distances. Lateral movement is also achievable by keeping the adjustable support arms 16, 17 stationary relative to the object bracket 14 or wire 48; and
7. vertically positioning the object by moving the adjustable support arms 16, 17 equal distances in opposite directions. Vertical position of the object will change depending on the relative position of the adjustable support arms 16, 17. If the distance separating the adjustable support arms 16, 17 is decreased, the object will be lowered vertically relative to the position of the substrate bracket 12. If the distance separating the adjustable support arms 16, 17 is increased, the object will be raised vertically relative to the position of the substrate bracket 12.

Also contemplated herein are a multitude of varied uses for the bracket of this application, including, but not limited to, the hanging of pictures, cabinets, mirrors, electronic devices, and for the installing and suspending of large scale, as well as heavy objects and structures on walls, buildings or other vertical, or upwardly inclined, substrates. The bracket apparatus can itself be quite small and lightweight, for use in hanging small to moderately sized pictures for example. It can, on the other hand, be much larger and possibly relatively heavy, depending on the application. The bracket apparatus can be economical, easy to make and maintain, durable, and easily boxed and shipped either in assembled or broken down (assemblable) form.

Also, as noted above, the bracket need not necessarily be mounted vertically, and components described above as being vertical are with regard to the bracket as used in a vertical orientation. In other orientations, the same components would not be vertical.

While certain embodiments and details have been included herein for purposes of illustrating aspects of the instant disclosure, it will be apparent to those skilled in the art that various changes in systems, apparatus, and methods disclosed herein may be made without departing from the scope of the instant disclosure.

Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The invention claimed is:

1. A substrate mounting apparatus comprising in combination:
    a laterally extending rigid base member having a main body portion, a top flange, and a bottom flange, wherein the main body portion, the top flange, and the bottom flange define a T-shape;
    a polygonal member having a bottom-most inverted-V-shaped side defining a flange extending along a length of a bottom-most edge of the inverted - V-shaped side;

a first rigid support arm slidably carried by the laterally extending rigid base member; and a second rigid support arm adjustably located along the laterally extending rigid base member and movable toward or away from the first rigid support arm, the first rigid support arm including a first polygonal-member support section and the second rigid support arm including a second polygonal-member support section, wherein the first polygonal-member support section and the second polygonal-member support section are each supportingly contactable with the inverted-V-shaped side of the polygonal member;

whereby the polygonal member is movable toward or away from the laterally extending rigid base member by adjusting spacing between the first rigid support arm and the second rigid support arm; wherein the first rigid support arm and the second rigid support arm each have a central section with at least a first channel configured to receive a first flange selected from the top flange and the bottom flange of the laterally extending rigid base member and slidable along the first flange selected from the top flange and the bottom flange of the laterally extending rigid base member.

2. The substrate mounting apparatus of claim 1, wherein the top flange and the bottom flange of the laterally extending rigid base member are configured to facilitate an adjustment of spacing between the first rigid support arm and the second rigid support arm, thereby also adjusting vertical spacing between the laterally extending rigid base member and the polygonal member.

3. The substrate mounting apparatus of claim 1, wherein the flange defined by the inverted-V-shaped side of the polygonal member comprises a first sloped portion opposing a second oppositely sloped portion, and wherein the first sloped portion and the second oppositely sloped portion are configured to contactably engage the first polygonal-member support section of the first rigid support arm and the second polygonal-member support section of the second rigid support arm, respectively.

4. The substrate mounting apparatus of claim 1, wherein moving the first rigid support arm and the second rigid support arm along the laterally extending rigid base member an equal distance in opposite directions adjusts a polygonal-member vertical position with respect to a laterally extending rigid base member vertical position.

5. The substrate mounting apparatus of claim 1, wherein moving the polygonal member laterally with respect to the first rigid support arm and the second rigid support arm adjusts a level position of the polygonal member.

6. The substrate mounting apparatus of claim 1, wherein moving the first rigid support arm and the second rigid support arm along the laterally extending rigid base member an equal distance in a same direction adjusts a lateral position of the polygonal member with respect to the laterally extending rigid base member.

7. The substrate mounting apparatus of claim 1, wherein the first rigid support arm and the second rigid support arm each have a second channel opposing the first channel, the second channel of each of the first rigid support arm and the second rigid support arm is configured to receive a second flange selected from the top flange and the bottom flange of the laterally extending rigid base member and slidable along the second flange selected from the top flange and the bottom flange of the laterally extending rigid base member.

* * * * *